US008068814B2

(12) United States Patent  
Celik

(10) Patent No.: US 8,068,814 B2  
(45) Date of Patent: Nov. 29, 2011

(54) PHONE TO PHONE DATA EXCHANGE

(75) Inventor: Feyzi Celik, Hopkinton, MA (US)

(73) Assignee: OnePIN, Inc., Westborough, MA (US)

( * ) Notice: Subject to any disclaimer, the term of this patent is extended or adjusted under 35 U.S.C. 154(b) by 0 days.

(21) Appl. No.: 13/084,000

(22) Filed: Apr. 11, 2011

(65) Prior Publication Data

US 2011/0189978 A1    Aug. 4, 2011

Related U.S. Application Data

(63) Continuation of application No. 12/575,188, filed on Oct. 7, 2009, which is a continuation of application No. 11/540,820, filed on Sep. 28, 2006, now Pat. No. 7,836,011, which is a continuation-in-part of application No. 11/353,452, filed on Feb. 13, 2006, now Pat. No. 7,813,725, which is a continuation-in-part of application No. 11/056,022, filed on Feb. 11, 2005, now Pat. No. 7,349,907, which is a continuation-in-part of application No. 10/879,331, filed on Jun. 29, 2004, now Pat. No. 7,509,349, which is a continuation-in-part of application No. 10/657,757, filed on Sep. 8, 2003, now Pat. No. 7,296,036, which is a continuation of application No. 09/223,129, filed on Dec. 30, 1998, now Pat. No. 6,374,259.

(60) Provisional application No. 60/102,614, filed on Oct. 1, 1998.

(51) Int. Cl.  
*H04W 88/02* (2009.01)

(52) U.S. Cl. .................................................... 455/412.1
(58) Field of Classification Search ............... 455/412.1, 455/416, 419, 422.1; 380/33; 370/271  
See application file for complete search history.

(56) References Cited

U.S. PATENT DOCUMENTS

| 2006/0128359 A1* | 6/2006 | Jung .............................. 455/406 |
| 2009/0005089 A1* | 1/2009 | Paik et al. ...................... 455/466 |
| 2009/0222748 A1* | 9/2009 | Lejeune et al. ............... 715/764 |
| 2010/0273445 A1* | 10/2010 | Dunn et al. ................. 455/404.1 |
| 2010/0330965 A1* | 12/2010 | Zabawskyj et al. ......... 455/412.1 |

FOREIGN PATENT DOCUMENTS

RU        2246754        2/2005

* cited by examiner

*Primary Examiner* — Diane Mizrahi  
(74) *Attorney, Agent, or Firm* — Mintz, Levin, Cohn, Ferris, Glovsky & Popeo, P.C.

(57) ABSTRACT

An information management system for operation over a network includes a first mobile device having a first application module, the first mobile device operating over the network and in communication with a second mobile device having a second application module, a first operating system residing on the first mobile device configured to detect a communication event between the first mobile device and the second mobile device, and an address book module residing on the second mobile device. The first application module is configured to send information associated with the first mobile device to the second mobile device in association with a detection of the communication event.

5 Claims, 30 Drawing Sheets

PHONE TO PHONE DATA EXCHANGE

RELATED APPLICATIONS

This application is a continuation of U.S. Ser. No. 12/575,188, filed Oct. 7, 2009, which is a continuation of Ser. No. 11/540,820, filed Sep. 28, 2006, now U.S. Pat. No. 7,836,011, which is a continuation-in-part of U.S. Ser. No. 11/353,452, filed on Feb. 13, 2006, now U.S. Pat. No. 7,813,725, which is a continuation-in-part of U.S. Ser. No. 11/056,022, filed on Feb. 11, 2005, now U.S. Pat. No. 7,349,907, which is a continuation-in-part of U.S. Ser. No. 10/879,331, filed Jun. 29, 2004, now U.S. Pat. No. 7,509,349, which is a continuation-in-part of U.S. Ser. No. 10/657,757, filed Sep. 8, 2003, now U.S. Pat. No. 7,296,036, which is a continuation of U.S. Ser. No. 09/223,129, filed Dec. 30, 1998, now U.S. Pat. No. 6,374,259, which claims priority from U.S. Ser. No. 60/102,614, filed Oct. 1, 1998, each of which is incorporated herein by reference in its entirety.

BACKGROUND OF INVENTION

The phonebook plays a significant role in mobile communications. It is the source of the contact information for phone calls, text messages, faxes, instant messages and emails. A challenge in the mobile phone market is inserting, updating, and maintaining contact information stored in the phonebook. Currently, one must manually enter another person's contact information into one's mobile phone. This takes time, is often difficult with such small buttons and screens on phones, and is prone to errors with manual data entry. Often, the result is that many individuals do not enter contact information into their mobile phonebooks.

In addition, these problems restrict the user from adding alternate phone numbers (e.g. business phone, home phone, and fax) associated with a contact, even though today's phonebooks can support multiple numbers. With the growth of more sophisticated phones (e.g. Smart Phones, IP phones, and Internet capable phones) there is also a need to store email addresses and Instant Message (IM) addresses of contacts. Entering email and IM addresses, however, can be even more problematic than entering phone numbers.

Another problem for users today is the inability to control the distribution of contact information to others. For example, one might provide a mobile phone number or business telephone number to another person but not want to provide their home telephone number. Thus, users continue to face many problems in using and benefiting from the capabilities of a device phonebook.

A few mobile phones contain a profile that acts as an electronic business card or vcard. The subscriber must locate the profile within his or her mobile phone and manually enter all of their contact information. The profile is then stored in the mobile phone's memory. If the subscriber wants to send their vcard to another person, both the sender and the receiver must have vcard compatibility on their mobile phones. If both mobile phones are vcard compatible, then the first subscriber can manually send his or her profile to the second subscriber via an SMS. Not only is this a manual and complex process, but it may become difficult to remember to whom the subscriber has sent their contact information. In addition, most subscribers don't even know whether their mobile phones have this capability. In general, similar functionalities are buried within the many layers of settings and small screens of the mobile phones.

SUMMARY OF THE INVENTION

Embodiments of the invention provide systems, methods, and device enhancements to automatically send, insert, exchange and update a caller's contact information into a user's phonebook. The phonebook can reside on either the UICC card (Subscriber Interface module ("SIM"), USIM, Mega SIM, any other smart card or an integrated chip), on the mobile device or on a remote server, for example. The automatic send and insert and/or automatic exchange mechanism is triggered when a communication happens (phone call, SMS interaction or email) between two mobile phones or other devices. Upon communication completion, a caller is asked if the caller wants to send his or her contact information to a communication recipient. If yes, the information is automatically sent to the recipient, based upon the permission levels provided by the sender, or caller. On the other end, the recipient of the contact information has the option of inserting the information on his or her device.

In general, in an aspect, the invention provides an information management system for operation over a network. The system includes a first mobile device having a first application module, the first mobile device operating over the network and in communication with a second mobile device having a second application module, a first operating system residing on the first mobile device configured to detect a communication event between the first mobile device and the second mobile device, and an address book module residing on the second mobile device. The first application module is configured to send information associated with the first mobile device to the second mobile device in association with a detection of the communication event.

Implementations of the invention may include one or more of the following features. The first mobile device can be configured to prompt a first user to enter information for storage in the first application module of the first mobile device. The second application module can be triggered to permit insertion of information transmitted via the communication event into the address book module. The first application module can be configured to prompt the first mobile device to send information stored in the first mobile device to the second mobile device. The second application module can be configured to prompt a user of the second mobile device to insert the information associated with the first mobile device into the address book module. The first application module and the second application module can exchange information associated with a first user.

Implementations of the invention may further include one or more of the following features. The first application module can be configured to detect a communication event in at least one of the first mobile device or the second mobile device. The information management system can include an address book module residing on the first mobile device. The application module can be configured to determine a frequency of the communication between the first mobile device and the second mobile device. When the frequency of the communication between the first mobile device and the second mobile device exceeds a threshold, the application module can be configured to send an updated information message to the second mobile device. The first application module can be configured to update information stored in the first mobile device. The first application module can be configured to prompt a first user to send the updated information to the second mobile device for automatic insertion into the address book module. The first application module can be configured to automatically provide updated information to contacts stored in the first mobile device. The first application module can be configured to allow entry of a permission level for the information stored in the first mobile device. The first application module can be configured to send information associated with the first mobile device that corresponds to the permission level to the second mobile device. The first application module can be configured to store the permission level that corresponds to the second mobile device. The first application module can be configured to store a sent record to indicate a time of sent data, a destination number and a permission level.

In general, in another aspect, the invention provides a mobile device configured to receive information communicated over a network. The mobile device includes an application module residing on a mobile device and configured to detect an incoming communication sent to the mobile device over the network, and a phonebook module residing on the mobile device and configured to store information contained in the incoming communication received by the mobile device. The application module detects the incoming communication and the application module is triggered to provide an option of storing information contained in the incoming communication in the phonebook module.

Implementation of the invention may include one or more of the following features. The incoming communication can comprise a SMS message received by the mobile device. The application module can be configured to prompt a first user of the mobile device for entry of the information or to update the information contained in the incoming communication. The device can include an operating system module, wherein the phonebook module resides on the operating system module. The application module can be configured to detect a call identifier of the communication to determine whether the calling number is a mobile device call identifier.

Features of the invention may provide one or more of the following capabilities. The process may alleviate storage issues and processing power issues. The system and processes of the invention assist in the integration issues of a Mobile Operator Network. Exchange of information between users on a network can be automated. Updates to information stored on a mobile device can be achieved automatically, or with manual entry by choice. The invention can memorize the phone numbers of subscribers that received a user's contact information. Other capabilities will be apparent upon review of the following figures and description.

FIGURES

DETAIL DESCRIPTION OF THE INVENTION

Embodiments of the present invention are directed generally to a method and an apparatus for inserting, exchanging, updating and storing contact information in a mobile phone used over a mobile network. Embodiments of the invention can be used to send, insert, exchange, update or store information other than, or in addition to, contact information. Further embodiments of the invention can be used for devices other than mobile phones and over networks other than mobile networks. Implementations of the invention are described as employing a Mobile phone operating system.

Figure 1:
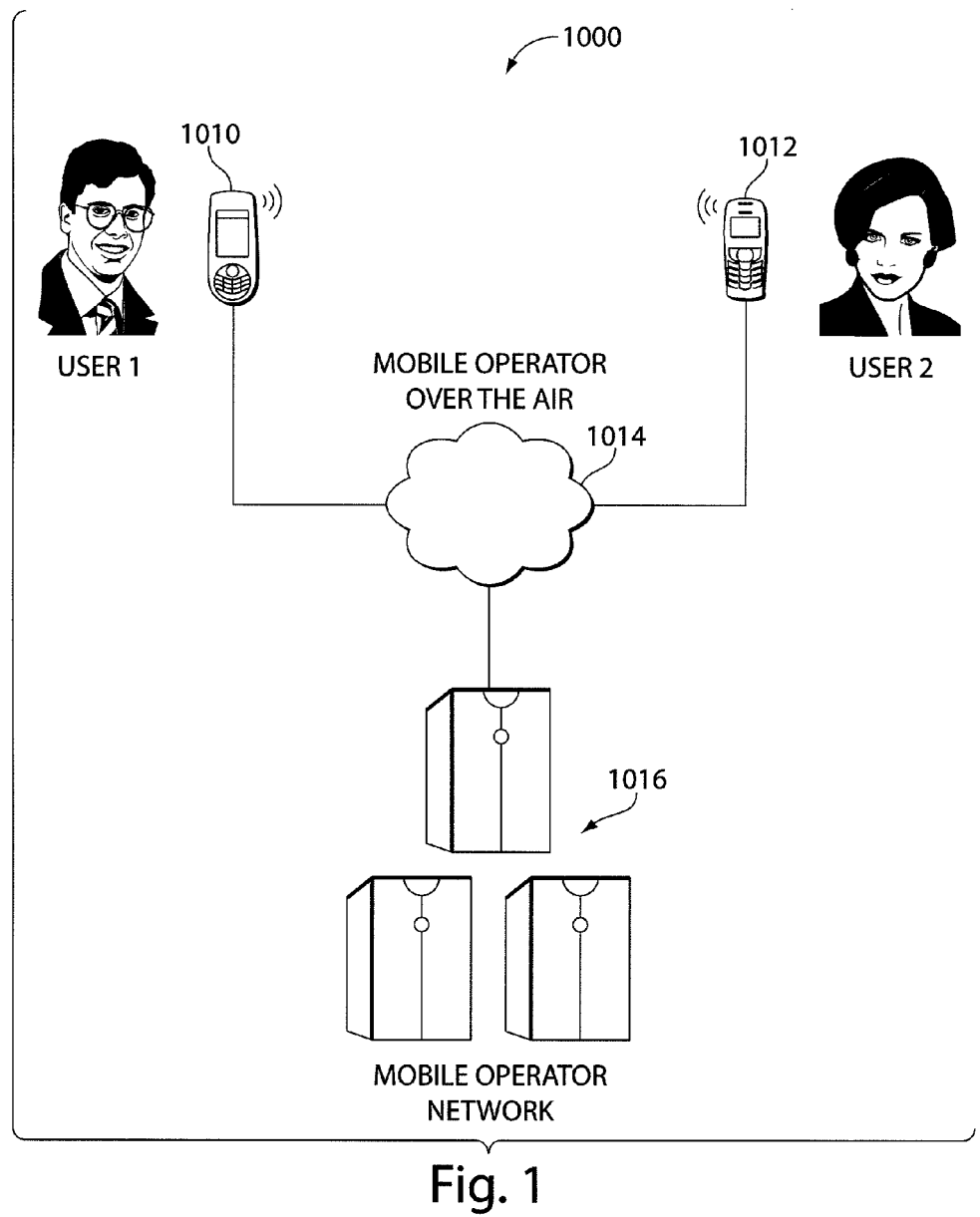
FIG. 1 is a schematic of a communication system according to one embodiment of the invention.

Referring to FIG. 1, a mobile contact management information system 1000 includes a first user phone 1010, a second user phone 1012, and a Mobile Operator-Over-The-Air (OTA) Communication Platform 1014 on a Mobile Operator's Network 1016. The contact management information system 1000 is an UMTS mobile operator network, for example. The system 1000 can be another type of mobile network, such as WCDMA (GSM), CDMA, CDMA2000 or a next generation phone system.

Figure 2:
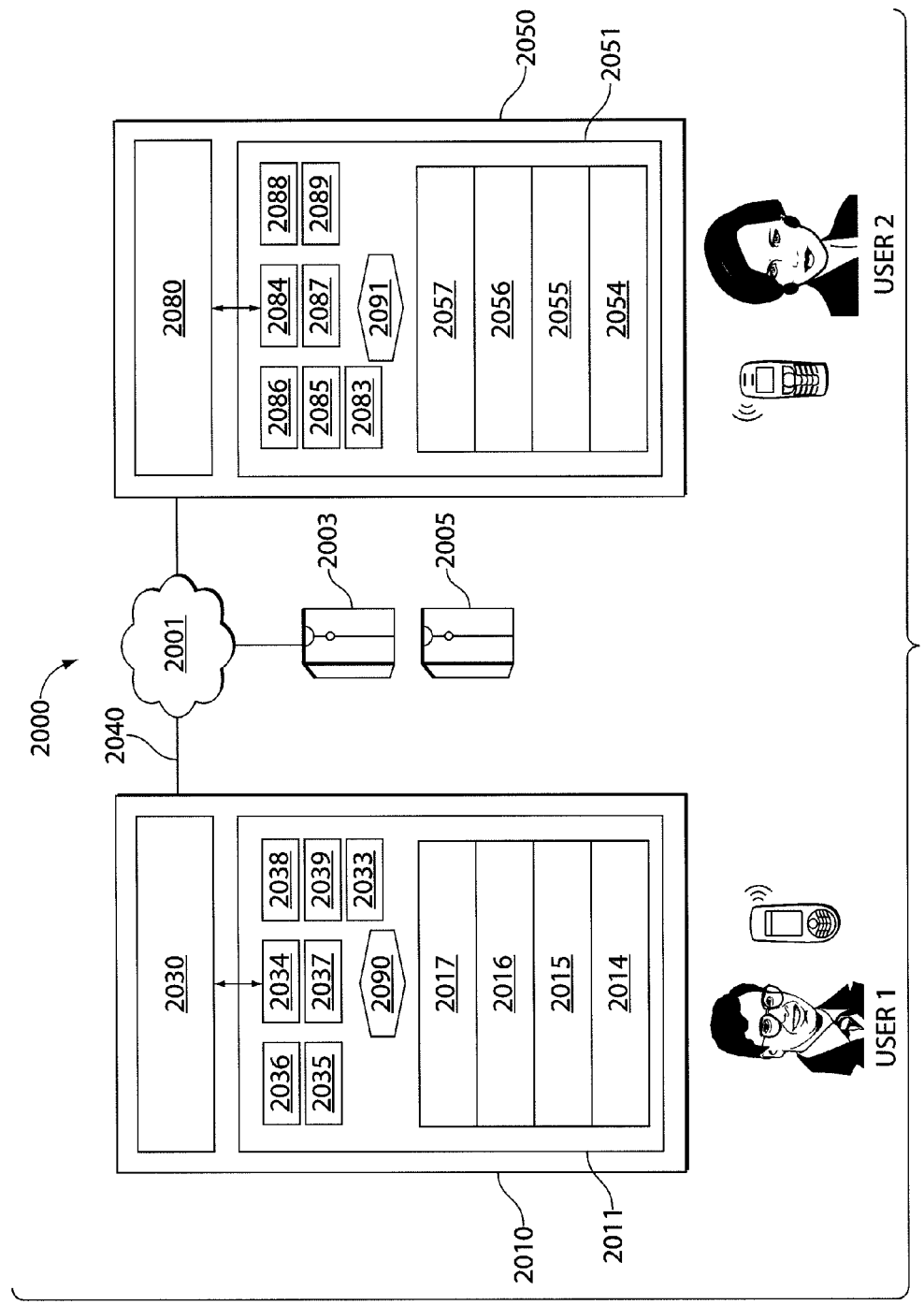
FIG. 2 is a schematic diagram of a mobile contact information management system according to one embodiment of the invention.

Referring to FIG. 2, a mobile contact management information system 2000 includes a first user device (first user phone) 2010, a second user device (second user phone) 2050, an OTA communication platform 2001, a remote computer 2003, and a remote database server 2005. The remote computer 2003 and the remote database 2005 can be a part of the mobile operator network, for example. The remote computer 2003 is coupled to the remote database 2005. The first user device 2010 and the second user device 2050 are connected to the OTA platform 2001. The OTA platform 2001 connects the first user device 2010 and the second user device 2050 to the remote computer 2003 and the remote database server 2005 over the mobile network.

The first user phone 2010 includes a phone operating system 2011 and a UICC card 2030. The phone operating system 2011 includes a phone event management module 2014, a phonebook module 2015, an SMS module 2016, a display module 2017, and a CallerXchange application module 2090. The phone operating system may include other modules. The phone operating system 2011 stores information, such as a first user last call time data file 2034, a first user MyProfile data file 2035, a first user call counter 2036, a first user last number dialed (LND) data file 2037, a first user last SMS sent time data file 2038, a first user update exchange log file 2033 and a first user configuration data file 2039. The information can be stored in a database. The files 2034, 2035, 2036, 2037, 2038 and 2039 can be edited locally or remotely via an OTA update.

The second user phone 2050 includes an UICC card 2080 and a phone operating system 2051. The phone operating system 2051 includes a phone event management module 2054, a phonebook module 2055, a SMS module 2056, a display module 2057, and a CallerXchange application module 2091. The phone operating system may include other modules. The phone operating system 2051 also stores information, such as a second user last call time data file 2084, a second user MyProfile data file 2085, a second user call counter 2086, a second user last number dialed (LND) data file 2087, a second user last SMS sent time data file 2088, a second user update exchange log file 2083 and a second user configuration data file 2089. The information can be stored in a database format. The files 2084, 2085, 2086, 2087, 2088 and 2089 can be edited locally or remotely via an OTA update.

The UICC cards 2030 and 2080 are integrated into the respective phone and phone operating system software for each of the first user phone 2010 and the second user phone 2050. The UICC card 2030 and the UICC card 2080 enable the first user device 2010 and the second user device 2050 to access the remote server 2003 and the remote database 2005 over the mobile network, OTA platform 2001 and the phone operator network. The CallerXchange application modules 2090 and 2091 are installed on each respective phone's operating system or can be programmed into the firmware of each phone.

The CallerXchange application module 2090 and the phonebook modules 2015 of the first user device 2010 can be combined such that both are deployed as a single software program. The CallerXchange application module 2091 and the phonebook module 2055 of the second user device 2050 can be combined such that both are deployed as a single software program. The UICC cards 2030 and 2080 can be a different type of information storage and execution medium such as a communication chip or a variation of a UICC or Smart Card. The UICC cards 2030 and 2080 can be another integrated smart card or chip within a phone. The phonebook modules 2015, 2055 may be replaced with another type of file or software program to manage the contact entries and other personalized items.

The CallerXchange application modules 2090 and 2091 are saved on the first user device operating system 2011 and the second user device operating system 2051, respectively. The modules 2090 and 2091 listen for communication-related events, send requests to other phones, receive caller information, and insert contact information into the phonebook modules 2015 and 2055. Additional features can include: software activation, personal information update, default access level setting, phonebook backup and restore. The application module 2090 is compatible with 2G and 3G specifications. The application module 2090 is built on the phone operating system. The application module 2090, 2091 supports Symbian operating system versions 6.0, 7.0, 8.0 and 9.0, for example, although the same application can be deployed on any operating system and/or firmware. The application module 2090 communicates directly with the application module 2091 via remote server 2003 and remote database 2005 through GPRS, SMS, MMS, TCP/IP, Infrared, Near Field Communication or other communication technologies. When the application module 2090 or 2091 is activated within the phone operating system, the memory footprint is approximately 100 k. Other memory requirements and storage capacity are possible and envisioned. Further, although functionality is discussed with respect to the first user device 2010, similar functionality is available and installed on the second user device 2050.

Figure 3A:
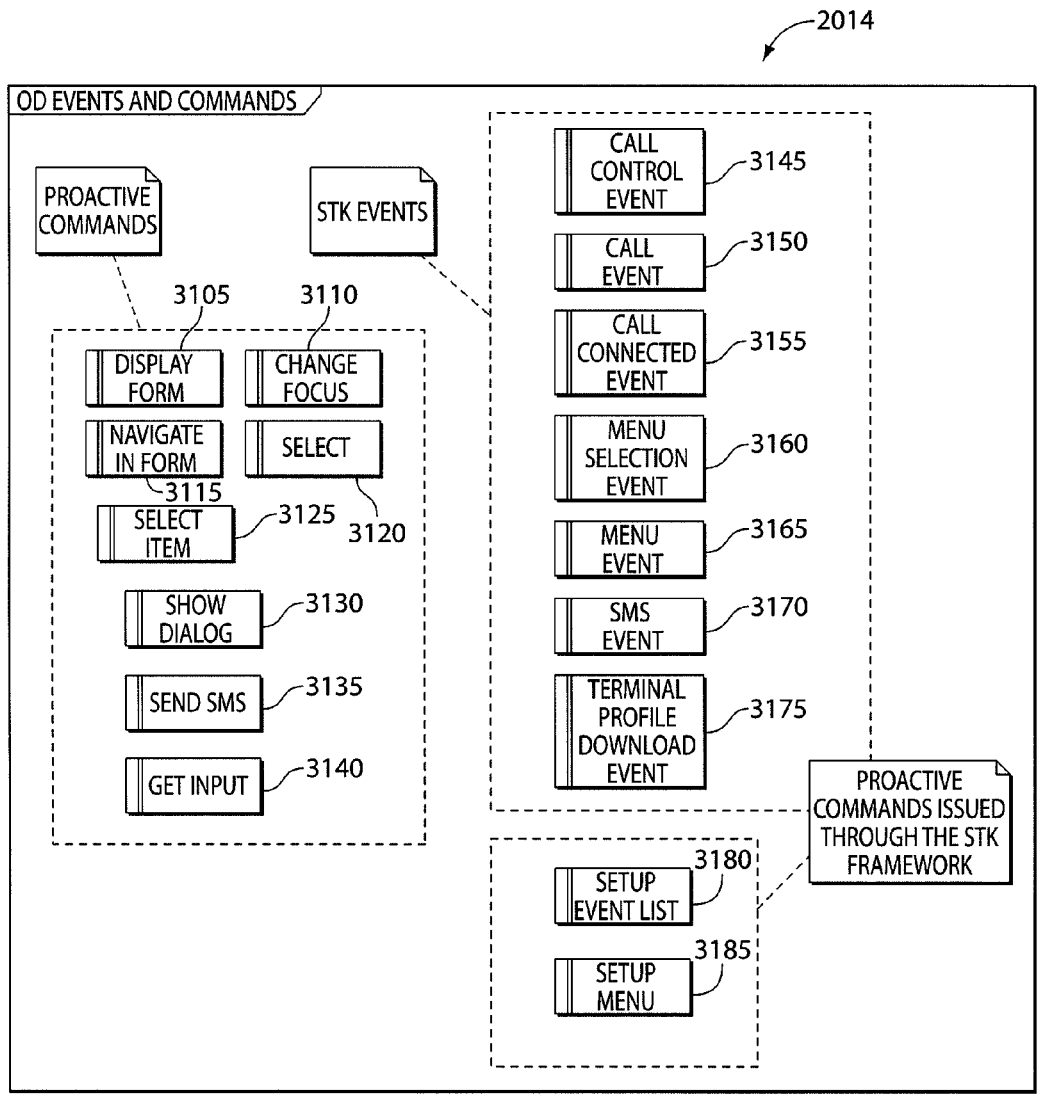
FIG. 3A is a schematic of portions of an application module that are built into a phone operating system.

Referring also to FIG. 3A, the application module 2090 is configured to use the Events and Commands on the phone operating system 2011. The application module 2090 communicates to the first user device 2010 through the Event Communication module 2014. The phone operating system 2011 runs a command for a display form 3105, a change focus 3110, a navigate in form 3115, a select button 3120, a select item option 3125, a show dialog 3130, a send SMS 3135, and a get input command 3140. A Setup Event List command 3180 and a Setup Menu command 3185 are proactive commands issued through the phone operating system 2011. The phone operating system 2011 registers with the following events of the first user device 2010: a Call Event 3150, a Menu Selection Event 3160, a Menu Event 3165, an SMS Event 3170, and a Terminal Profile Download Event 3175.

Figure 3B:
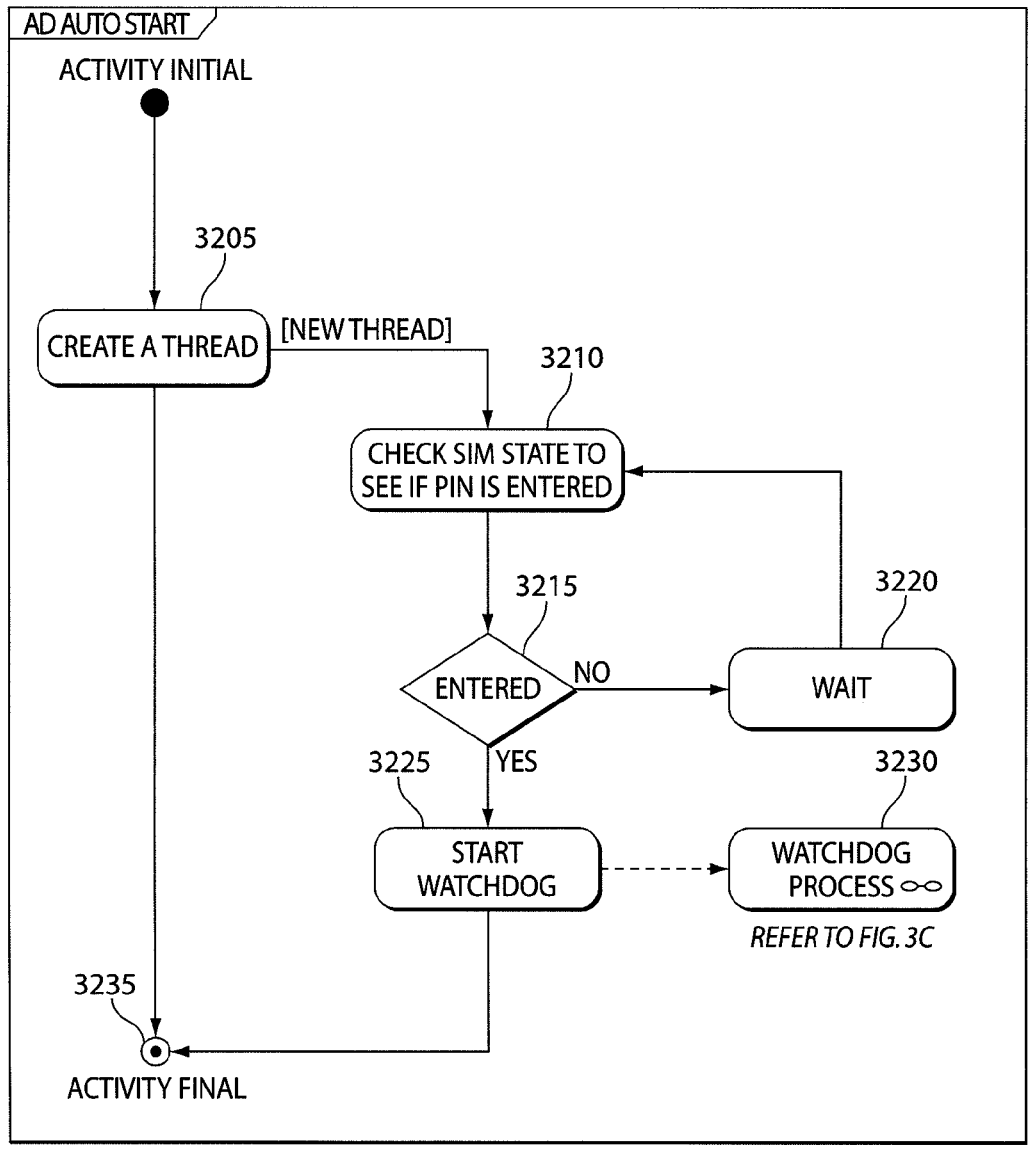
FIG. 3B-3C is a flow chart of an operation of a user device application module.

Referring also to FIG. 3B, the application module 2090 is configured to start a routine within the phone operating system 2011. The phone operating system 2011 is turned on within the first user device 2010. At stage 3205, a new thread is started and the application module 2090 is configured to check if the PIN entered into the SIM at stage 3215 is correct. If the PIN is not entered, the application module 2090 waits for the PIN to be entered, stage 3220. When the PIN is properly entered the application module 2090 starts the Watchdog Process, at stage 3225 (see FIG. 3C and associated description). The second user application module 2091 uses substantially the same process within the phone operating system 2051 to start the application module 2091 routine.

Figure 3C:
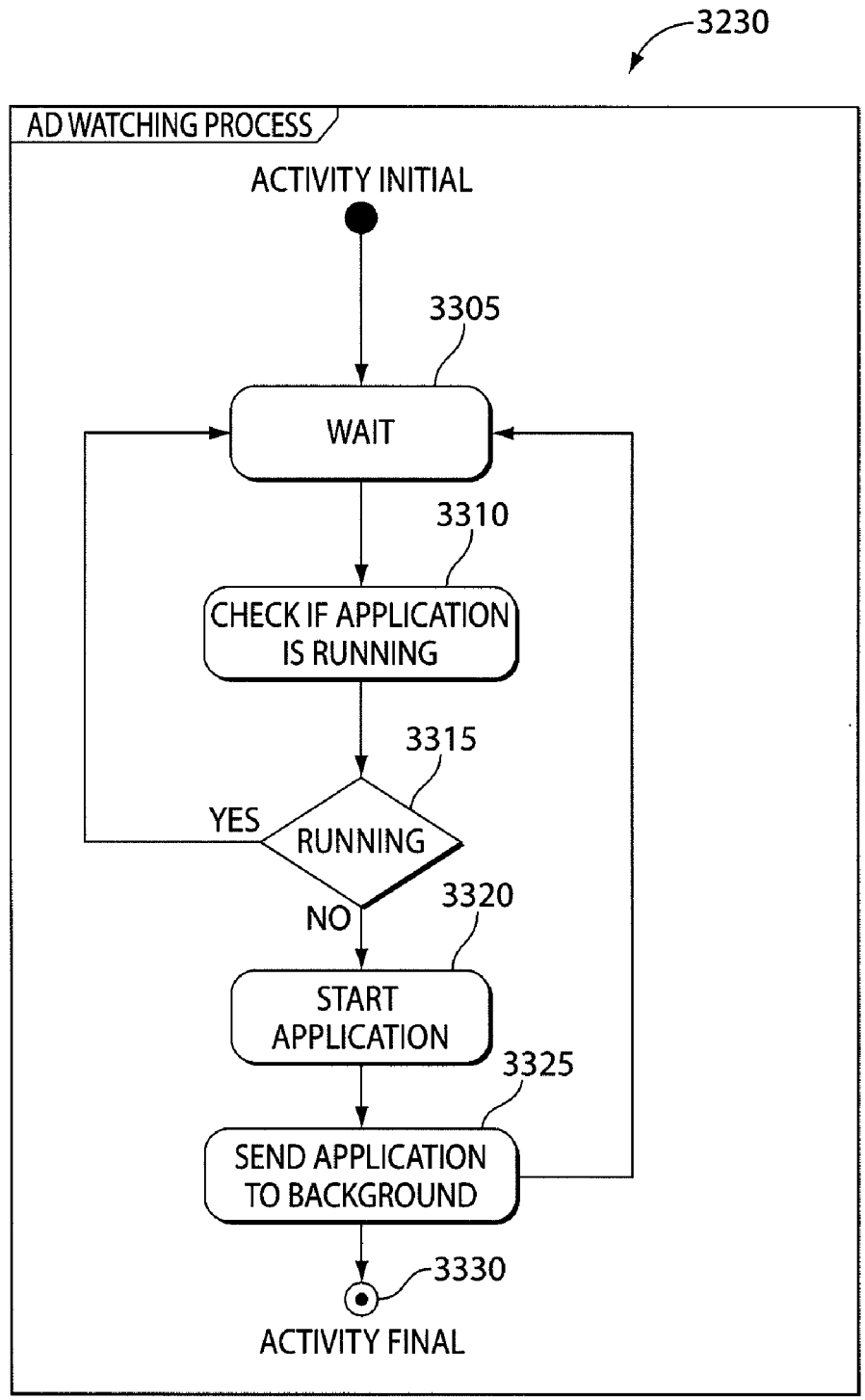

Referring also to FIG. 3C, the first user phone operating system 2011 checks if the application module 2090 is running, at stage 3310. If the application module 2090 is running, at stage 3305, the system waits for the application module 2090 to complete the run process. If the application module 2090 is not running, the phone operating system 2011 proceeds to stage 3320 where the application is started. At stage 3325, the application is sent to the background and returns to stage 3305 to wait for the next event. Similarly, the second user application module 2091 uses substantially the same process within the phone operating system 2051, and waits for the next event.

Figure 4A:
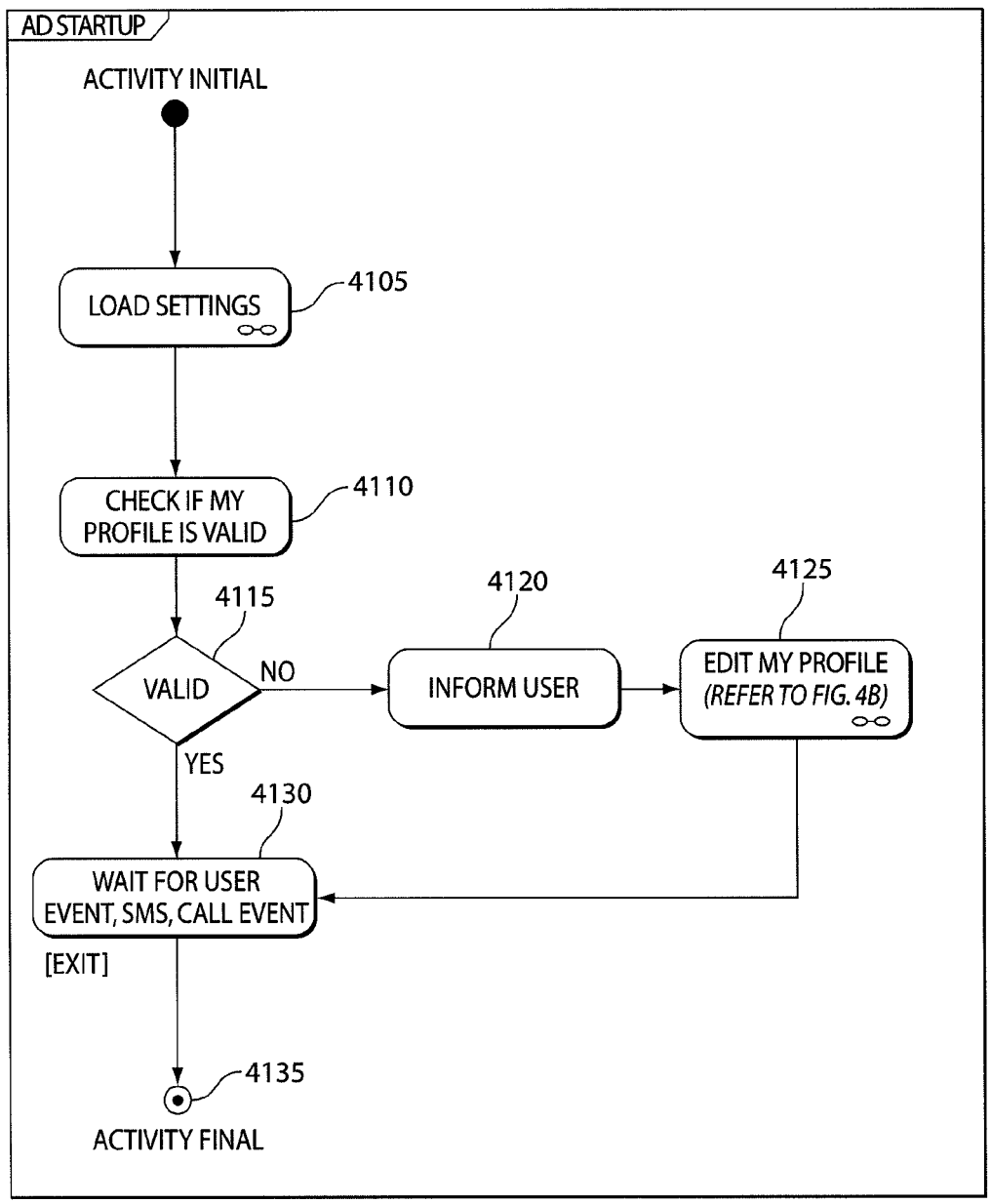
FIG. 4A-4C is a flow chart of an application module activation process by the user device.

Referring to FIG. 4A, the first user application module 2090 is activated by the first user. The first user phone 2010 is turned on and the application module 2090 is triggered, at stage 4105. At stage 4110, the application module 2090 determines if the MyProfile data is valid (see FIG. 4B and associated description). If the information is correct, The application module 2090 waits for a User Event, SMS, or Call Event, at stage 4130. If MyProfile data is not valid or is incomplete, then at stage 4120 the application module 2090 prompts the first user to complete the MyProfile information by selecting the Edit MyProfile screen, at stage 4125 (see FIG. 4B and associated description).

Figure 4B:
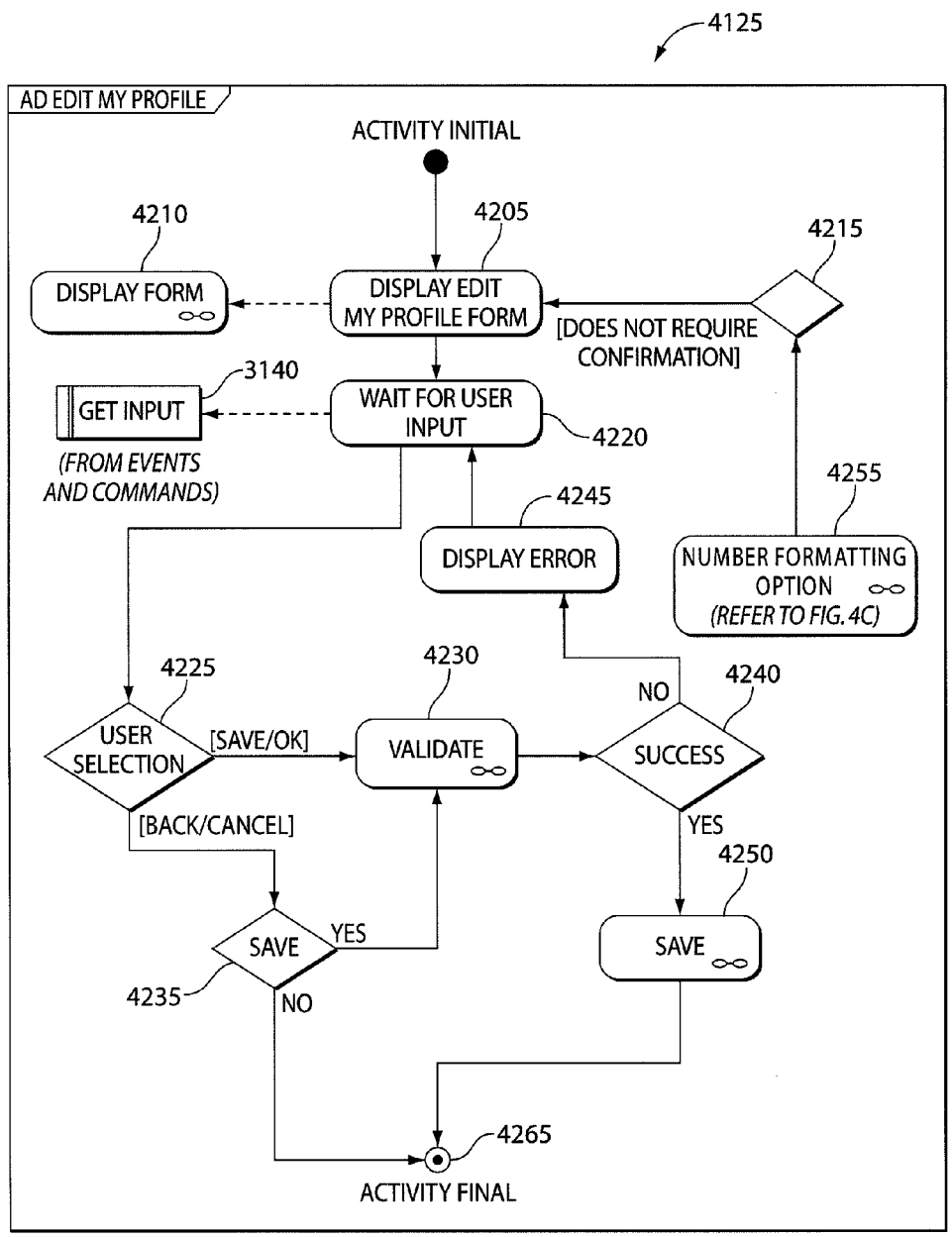

Referring to FIG. 4B, at stage 4205, the first user is asked to setup the first user MyProfile data file 1035 by entering each field of his or her contact information in a sequential manner. The first user MyProfile data file 2035, in conjunction with the application module 2090 enables the first user to send his or her contact information to others. The standard fields of contact information include fields for a Name, Mobile Phone Number, Business Phone Number, a Home Phone Number and an email address. In each entry, at stage 4215, the first user application module 2090 waits for the user input and collects the data through a Get Input Proactive Command 3140. At stage 4230, the first user application module 2090 validates if the user data is in a valid format. At stage 4225, the first user is asked if the information is correct, and the correct information is saved at stage 4235. If the information is not in a proper format, an error message is displayed at stage 4245. The first user is prompted to make a new entry at stage 4215.

The first user can manually navigate to the settings menu and edit the MyProfile data in order to update their contact information on the application module 2090. Once the first user is finished updating the MyProfile data, the application module 2090 prompts the user to choose whether or not they want to send a broadcast update to those who previously received the information. For instance, if the first user originally opted to send the second user his/her "Business" contact information and the first user updates their "Personal" contact information, the first user would only be prompted to send a broadcast update to those users who he/she originally sent the "Personal" contact information to, and not to the second user. If the first user opts not to send the broadcast update, the first user is prompted to send his/her updated information to those contacts who were originally sent the level of contact information after the next communication event. The destination numbers and permission levels associated with each of the users are stored within the first user exchange log file 2033.

In general, phone numbers entered match an International numbers scheme according to the International Dialing Rules. The format of the numbers is validated at stage 4255

Figure 4C:
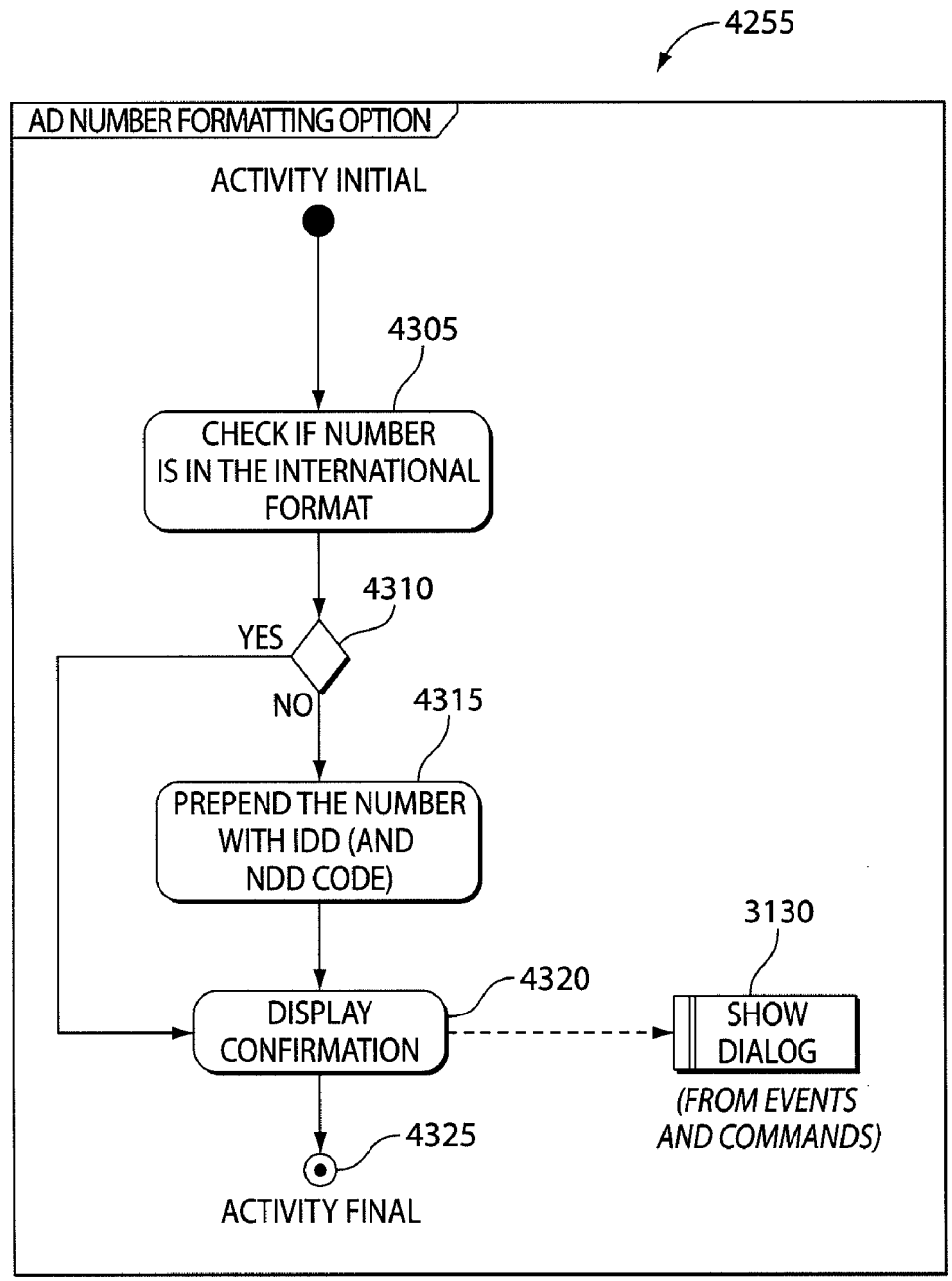

(see FIG. 4C and accompanying description). For demonstration purposes, the standard fields of contact information are Name, Office Phone, and Home Phone. Other fields of data may be entered after the initial set up process, such as "Email" or "Instant Messenger". The contact data fields can be limited to the standard fields, but may include other fields. The users have the option of changing these designations at any time by accessing the application modules 2090 and 2091. The application module updates the MyProfile Data File 2035 for the first user and the MyProfile Data File 2085 for the second user (see FIG. 7A and associated description).

Referring also to FIG. 4C, the first user application module 2090 checks if the entered contact phone numbers are in the correct International Format and detects if the number dialed is a mobile line. Each time the first user is asked to enter a phone number (Mobile, Work and Home), the CallerXchange application module 2090 validates whether the entered numbers matches international numbering format (e.g., +15088368810 for the U.S.) and whether the number dialed is a mobile line, stage 4305. The dialing rules are customized per operator and include a mandatory International Direct Dialing (IDD) value, a mandatory Country Code value, a mandatory National Direct Dialing (NDD) prefix value and optional Mobile prefixes values. The rules can assist the mobile line detection process. If the formatting is correct, the process terminates at stage 4325. If the formatting is incorrect, the application module 2090 appends the International Direct Dialing (IDD) and the National Direct Dialing (NDD) code to the numbers, stage 4315.

The configurable feature mobile line detection uses a predetermined dialing scheme to determine whether the dialed number is a fixed line or a mobile number. If it is a fixed line, then CallerXchange does not ask the subscriber to send MyProfile. This functionality is dependent upon the geographical region having a differentiating dialing scheme for fixed or mobile lines. The application module 2090 checks if the number is dialed with a "+" sign. If the number is dialed with a "+" sign, then the application module 2090 checks if the Country Code matches the one defined in the dialing rules. If the Country Code matches, then the application module 2090 checks if any of the mobile prefixes defined in the configuration match the prefix in the dialed number. If yes, then a local mobile number is detected. If no, then a local fixed line is detected. If the Country Code doesn't match, then an international number is detected. If the number is not dialed with a "+" sign then the application module 2090 checks if the International Direct Dialing (IDD) matches the one defined in the dialing rules. If the IDD matches the one in the dialing rules, then the Country Code is checked to see if it matches the one defined in the dialing rules. If it is, the application module 2090 checks if any of the mobile prefixes defined in the configuration match the prefix in the dialed number. If yes, a local mobile number is detected. If no, a local fixed line is detected. If the Country Code does not match the one defined in the dialing rules, then an international number is detected. If the IDD does not match the one defined in the dialing rules, then the number is unknown. The National Direct Dialing (NDD) prefix is skipped automatically if it matches the one defined in the dialing rules. CallerXchange asks the "Send" question after a dialed number that is defined as a mobile number or is an international number. CallerXchange can be configured to not ask the "Send" question after an international number is dialed. The confirmation is displayed to the user using the Show Dialog Proactive Command 3130. Once the confirmation is displayed, the process is terminated, at stage 4325. After the numbers input by the user are checked to fit to International Formats, the numbers are stored within the first user MyProfile Data File 2035.

Figure 5A:
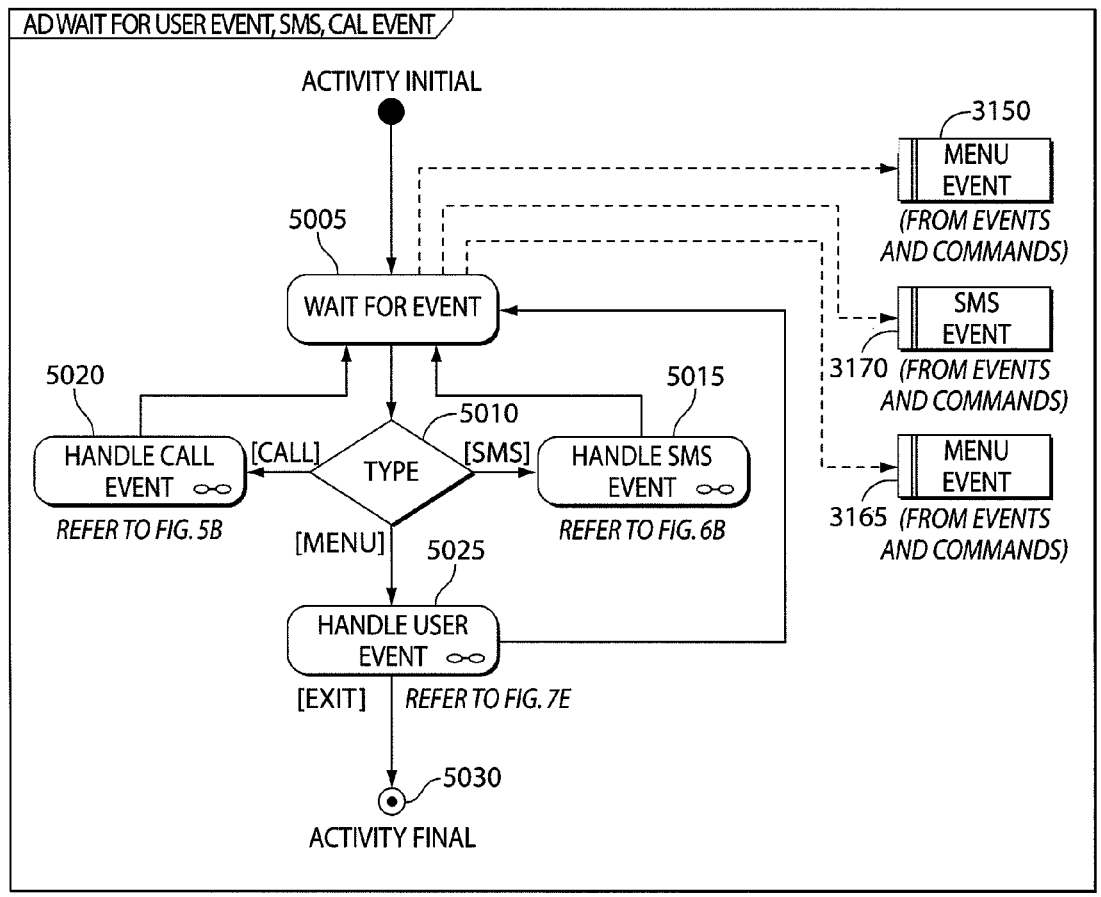
FIGS. 5A-5F are data flow charts of subsystems of triggering the user application module over a wireless network.

Referring to FIG. 5A, the first user application module 2090 is triggered over the mobile phone 2010 and the phone operating system 2011. The first user phone is in an idle state, at stage 5005. The first user device waits for one of the following events to occur: SMS Event 5015, Call Event 5020 or a User Event 5025. The first user device may send or receive an SMS (see FIG. 5G and associated description), make an outgoing call (see FIG. 5B and associated description), or manually navigate through the menu (see FIG. 7E and associated description) which triggers the first user application module 2090.

Figure 5B:
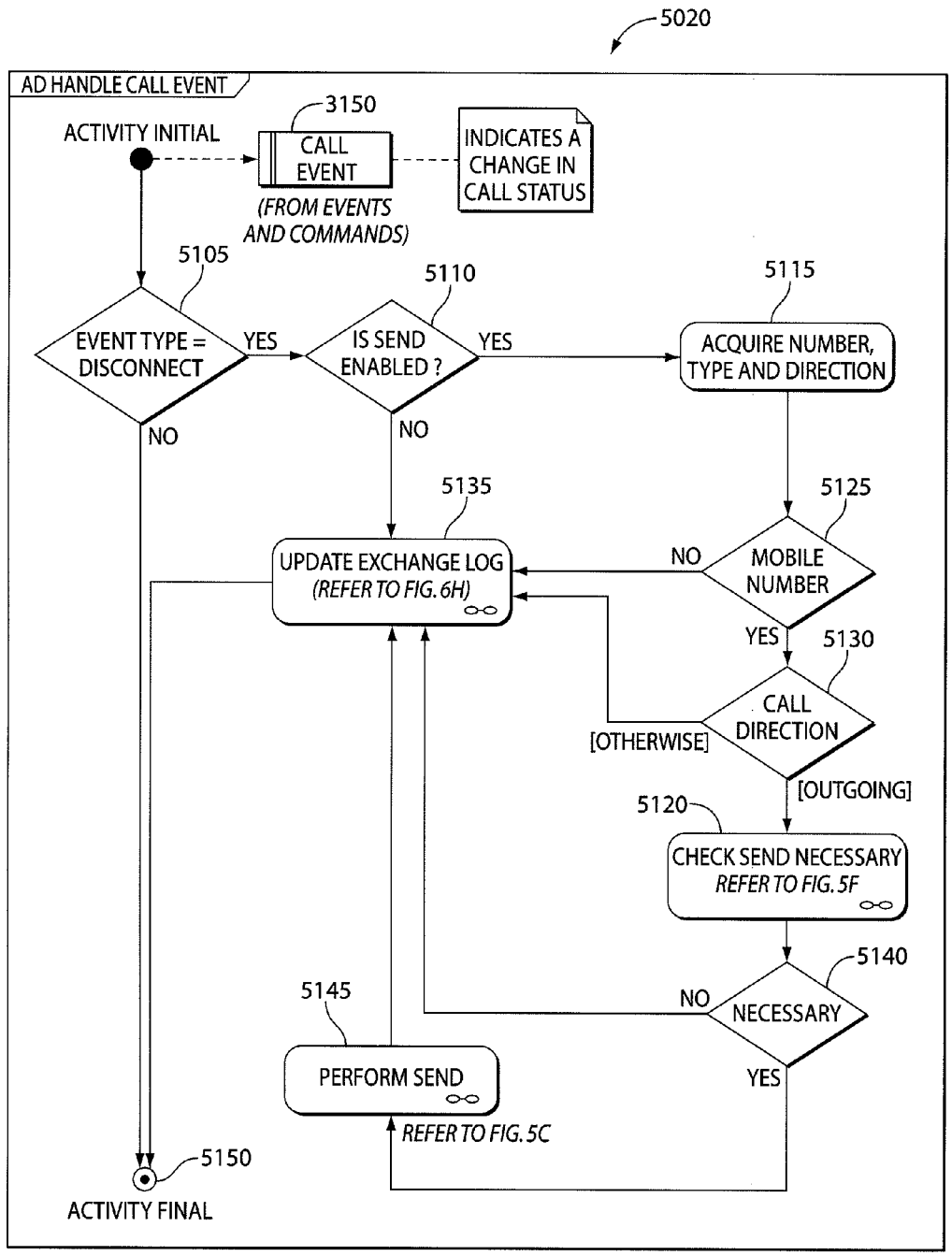

Referring to FIG. 5B, the first user application module 2090 is initiated over the mobile phone 2010 and the phone operating system 2011. The first user makes a phone call to the second user. A Call Event Proactive Command 3150 has occurred. The first user application module 2090 is triggered and waits for the next event. A Call Event 3150 occurs and the application module checks the type of Call Event, at stage 5105. The application module 2090 is configured to determine if the application has been disabled by the first user within the Settings Menu. If it is set to a "Disable" state, then the first user application module 2090 is sent to stage 5135 and the application module 2090 is configured to update the Exchange Log (see FIG. 6H and associated description). The application module 2090 returns to an original state and waits for the next User Event, SMS or Call Event.

At stage 5110, the first user application module 2090 determines if the application module 2090 is set to an "Enable" state. If the applet is in the "Enable" state, the first user application module 2090 retrieves the phone number of the second user mobile phone 2050 from the call event 3150. At stage 5115, the first user application module 2090 detects the number, number type and call direction. If the number is a listed national mobile number, the application module 2090 sets the applet state as a "Call Event Happened," stage 5125. The first user application module 2090 determines if the call was incoming or outgoing, at stage 5130. If the call was outgoing the Check Send Necessary process is triggered (see FIG. 5F and associated description). If it is determined that a Send operation is necessary, the application performs a Send operation at stage 5145 (see FIG. 5C and associated description), an Updates Exchange Log operation at stage 5135 (see FIG. 6H and associated description), and returns to a rest state to await a User Event, SMS or Call Event. If the Send operation is not necessary, the application performs an Updates Exchange Log operation at stage 5135 (see FIG. 6H and associated description) and returns to a rest state to await the next User Event, SMS or Call Event. If the dialed number is a "non-mobile" number, then the first user application module 2090 proceeds to the Updates Exchange Log operation (see FIG. 6H and associated description) and returns to a rest state to await the next User Event, SMS or Call Event. At stage 5105, if an incoming call is identified, the applet returns to a rest state and waits for the next User Event, SMS or Call Event.

Figure 5C:
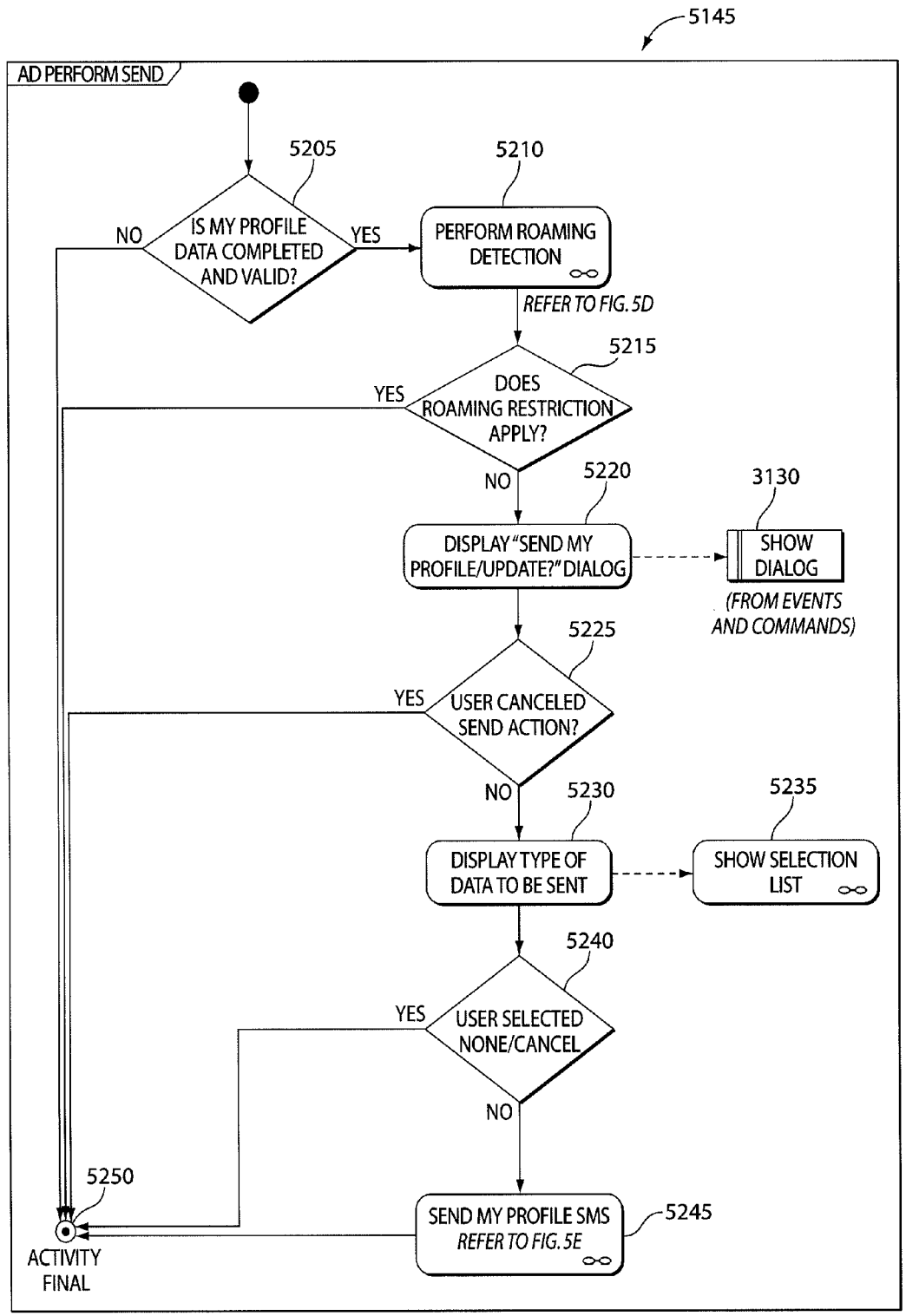

Referring to FIG. 5C, the first user contact information is sent, via the application module 2090, over the mobile phone 2010 and the phone operating system 2011 to the second user mobile phone 2050. At stage 5205, the first user application module 2090 checks if the first user MyProfile Data File 2035 is complete and valid. If it is not, the application prompts the user to enter the MyProfile data by going through the Edit MyProfile process (see FIG. 4B and associated description). At stage 5210, if the first user MyProfile Data File 2035 is complete and valid, the first user application module 2090 performs a Roaming Detection (see FIG. 5D and associated description). At stage 5215, if the roaming restriction applies, the application proceeds to stage 5250. If there are no roaming restrictions in place, at stage 5215, the first user application module 2090 triggers a question to the Display Control module 2017: "Send My Profile?" If the first user selects the Send option, the Show Selection List 5235 is displayed on the phone of the first user, where he or she is prompted to select one of five levels of permission: "Personal," "Business," "Mobile Only," "All," "Do not Send" or "Settings." If the first user selects "Do not Send" or decides to cancel the action, the application module 2090 does not prompt any other questions and proceeds to stage 5250. The first user application module 2090 stores the permission level associated with the second user, within the first user exchange log file 2033.

Figure 7A:
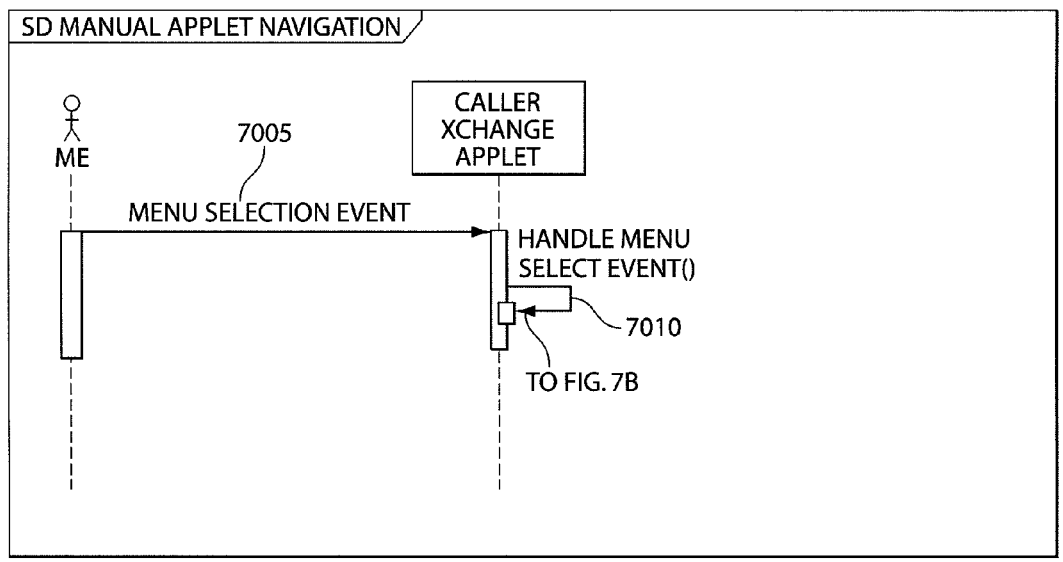
FIGS. 7A-7H are data flow charts of subsystems of manual operation of an information exchange routine over a communication system.
Figure 7B:
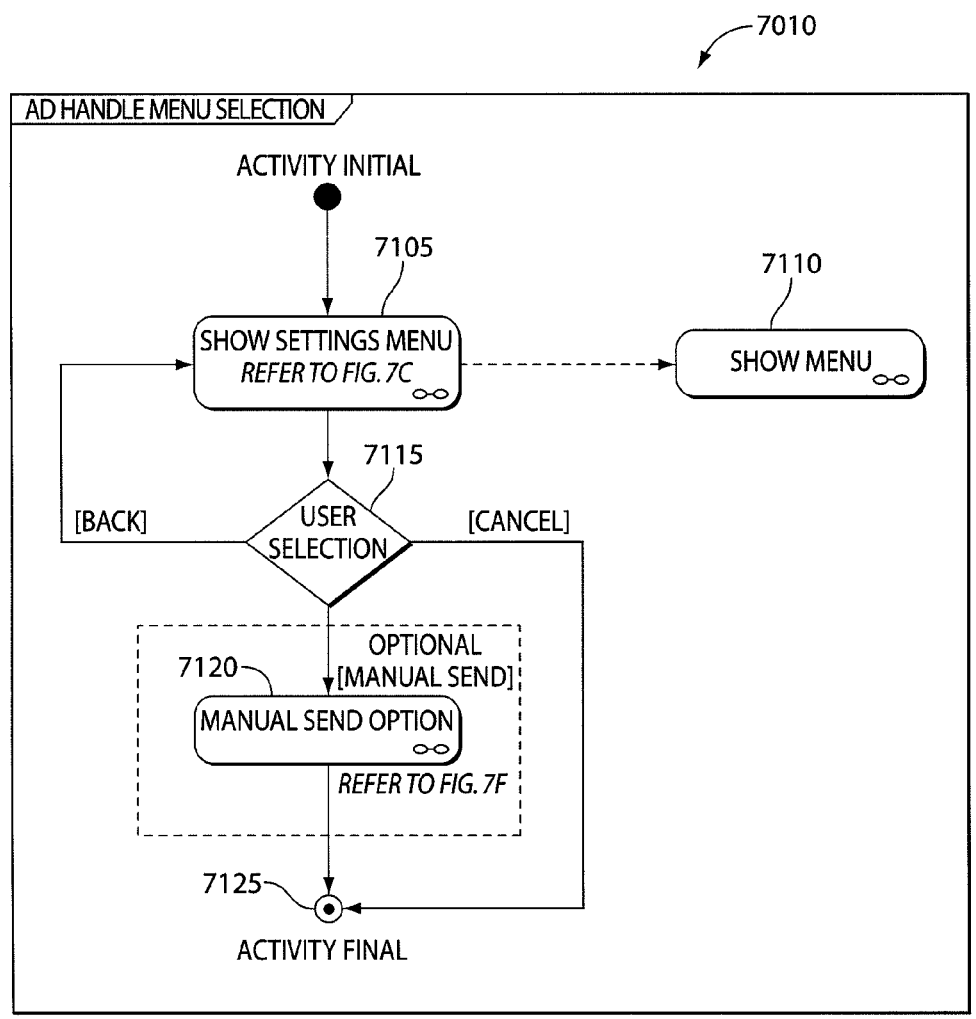
Figure 7C:
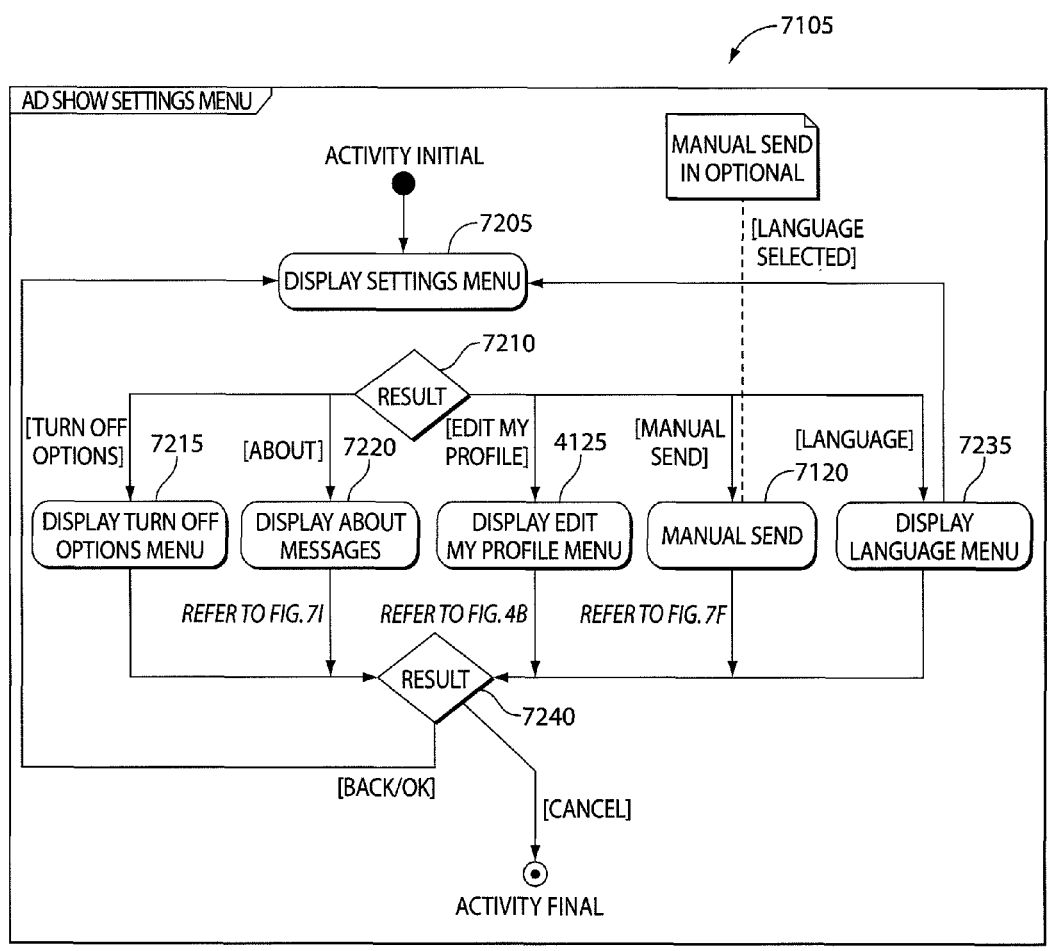

If the first user selects "Settings," then the application module 2090 displays a Settings Menu to make modifications to MyProfile or to Disable/Enable the Send and Add Features (see FIG. 7C and associated description). If the first user selects one of the other permission levels (e.g., "Personal," "Business," "Mobile Only," "All"), then the first user application module 2090 creates a "Send MyProfile" SMS, at stage 5245 (see FIG. 5E and associated description). The application module 2090 stores the permission level that the first user chose for information sent to the second user phone 1012. The application module 2090 alerts the first user of the additional charges that may occur as a result of the exchanging of contact information using SMS. When the first user chooses to send his or her contact information for the first time, the first user is notified by the following message: "You are going to send SMS, are you sure you want to continue?", or some such indication or message. The notification is made once, and if the first user either accepts or rejects sending SMS the first time the notification is made, this message may not be displayed for subsequent SMS communication events. At stage 5250, the first user application module 2090 goes back to its original state and waits for the next User Event, SMS or Call Event.

Figure 5D:
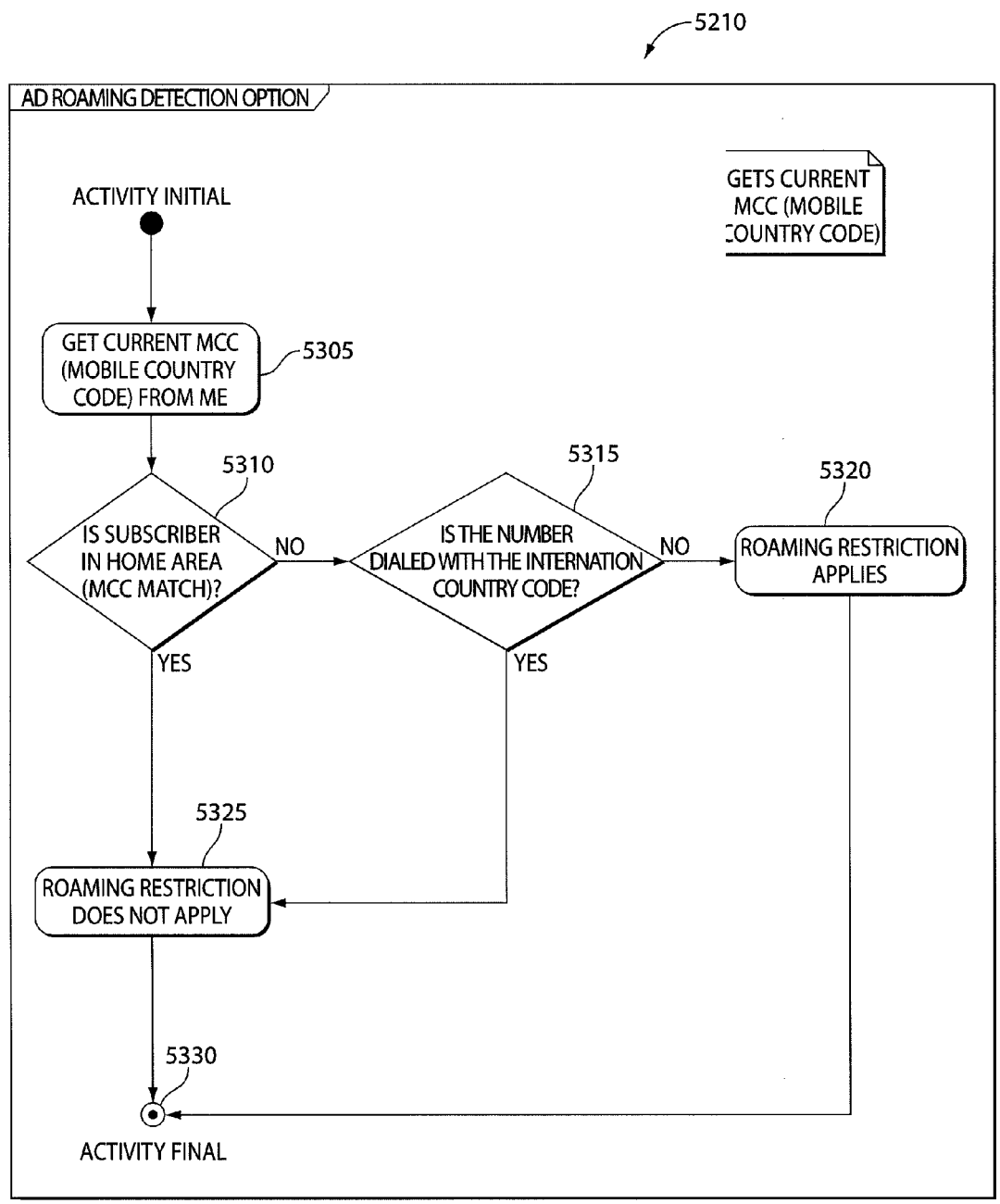

Referring to FIG. 5D, the first user application module 2090 activates the roaming detection at stages 5210 and 5305, and the first user application module 2090 gets a Mobile Country Code (MCC) at stage 5305 from the phone 2010. At stage 5310, if the current MCC matches the first user's MCC, the roaming restriction does not apply. At stage 5310, if the current MCC does not match the first user's MCC, then, at stage 5315, the first user application module 2090 checks the number dialed with the International Country Code. If the number was dialed with the International Country Code, the roaming restriction does not apply. If the International Country Code is not dialed, at stage 5315, then roaming restrictions apply and the application returns to its original state and waits for the next User Event, SMS or Call Event.

Figure 5E:
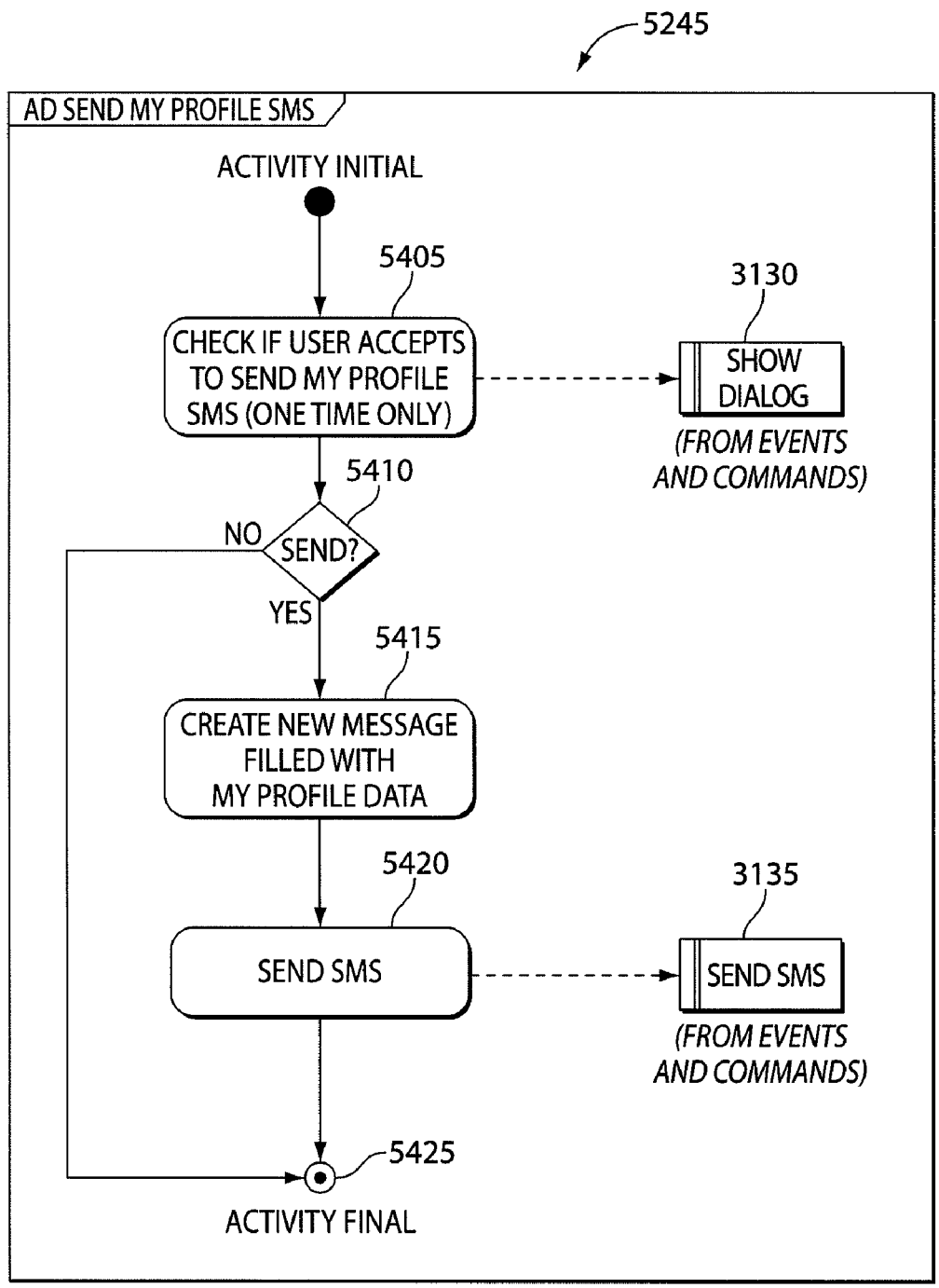

Referring to FIG. 5E, the first user application module 2090 sends the first user contact information in an SMS. At stage 5405, if the first user selects the "Personal" option, a confirmation message is displayed on the first user display module 2017 through the Show Dialog Proactive Command 3130: "Sending MyProfile SMS . . . ." At stage 5420, an SMS message is sent that contains, for example, first name, last name, mobile and home data fields specified in MyProfile. If the first user selects the "Business" option, then a confirmation message is displayed: "Sending MyProfile SMS . . . " and the SMS message is sent and contains first name, last name, mobile and business data fields specified in MyProfile. If the first user selects the "Both" option, a confirmation message is displayed: "Sending MyProfile SMS . . . " and the SMS message is sent and contains first name, last name, mobile, home and business data fields specified in the MyProfile Data File 2035.

Figure 5F:
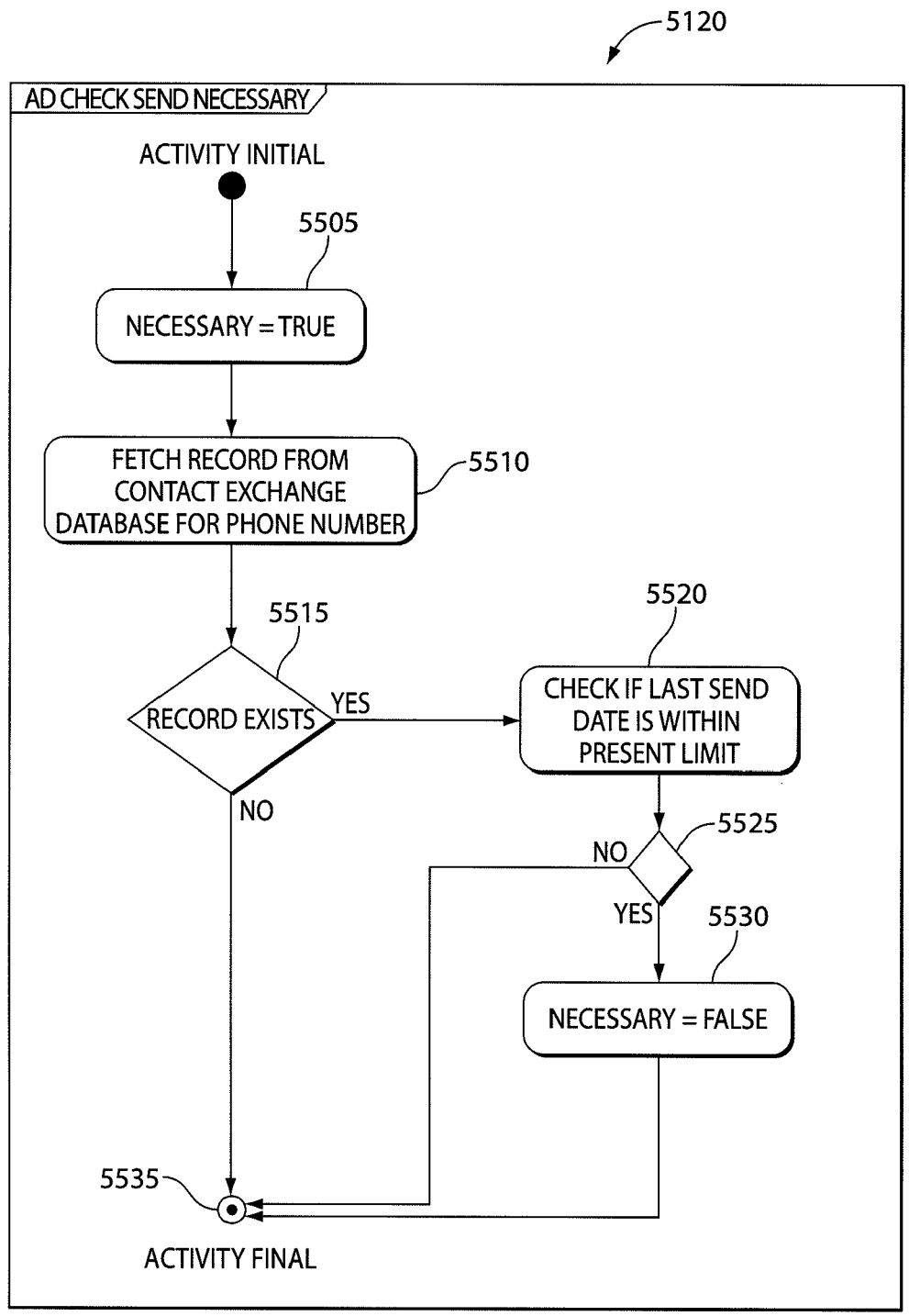

Referring to FIG. 5F, in order to avoid the repetition of the question "Send MyProfile?" for the same dialed number, the application module 2090 remembers the numbers (stored in Last Number Dialed Data File 2037) and dates (stored in Last Call Time Data File 2034) to which the user previously sent MyProfile information. This information is stored within the memory of the first user phone 2010. Within the Settings Menu the user can determine the preset time limit to remind him or her to send an updated MyProfile to those listed within this database. At call termination, the application module 2090 fetches the record (the second user device number) from the contact exchange database, at stage 5510. If the record exists in the database, the application checks if the Last Call Time is within the present time frame, at stage 5520. If the Last Call Time is within that limit, then the application module 2090 goes back to its original state and waits for the next User Event, SMS or Call Event. If the Last Call Time is outside of the time frame or if the record does not exist in the database, then the application continues to perform Send, (see stage 5145 in FIG. 5B and associated description).

Figure 6A:
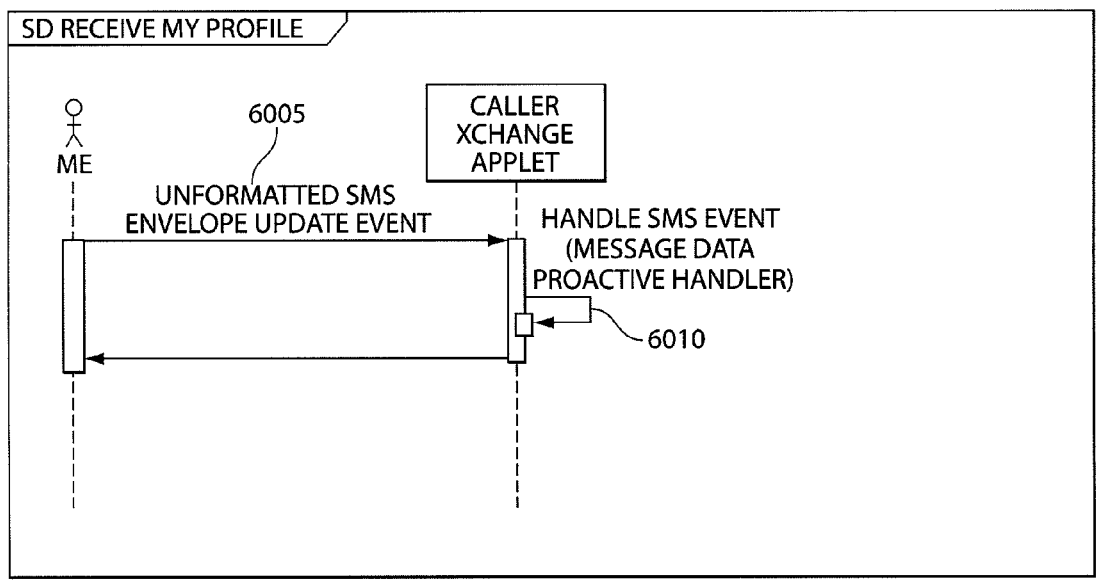
FIGS. 6A-6H are data flow charts of subsystems of an information exchange routine.

Referring to FIG. 6A, contact information is inserted into the second user phonebook module 2055. The second user application module 2091 communicates with and receives the first user contact information and inserts the information into the second user phonebook module 2055. Contact exchange occurs between the first user and the second user via a network. The second user application module 2091 communicates, packages and sends the second user contact information to the first user. At the completion of a mode of communication, the first user chooses to send his or her contact information. The second user completes activation of the second user application module 2091, preferably prior to the first user sending the first user contact information to the second user. Referring also to FIG. 2, the first user SMS message travels through the OTA Platform 2001 and the Mobile Operator SMS-C Center 2040. The second user phone 2050 receives a SMS message that contains the first user contact information. The incoming SMS triggers the second user application module 2091.

Figure 6B:
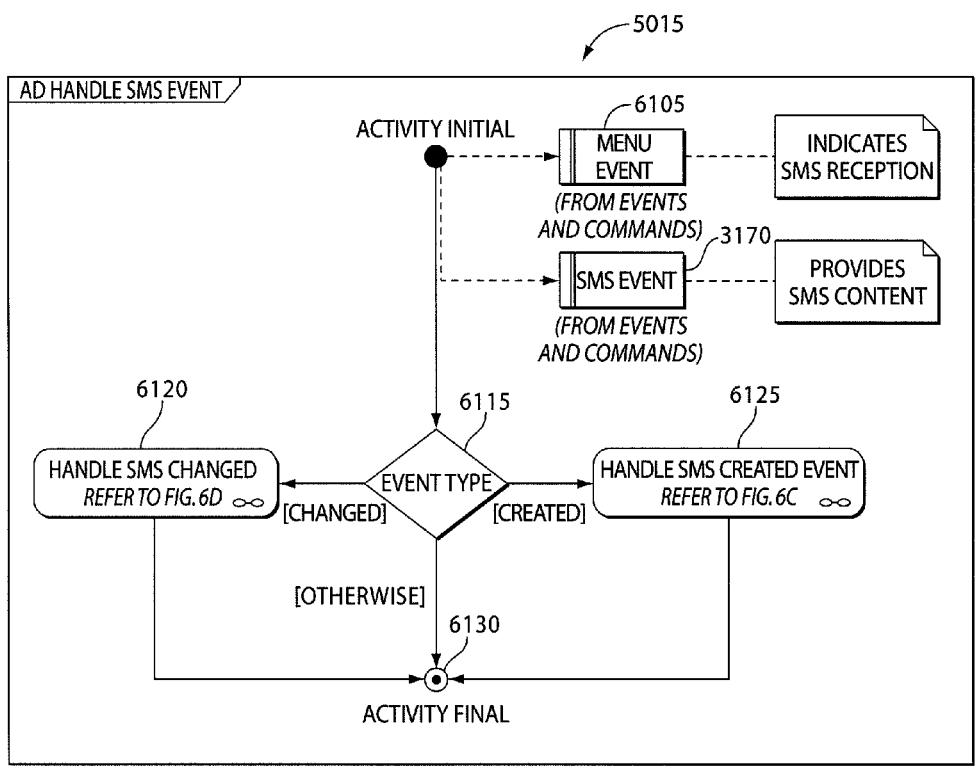
Figure 6C:
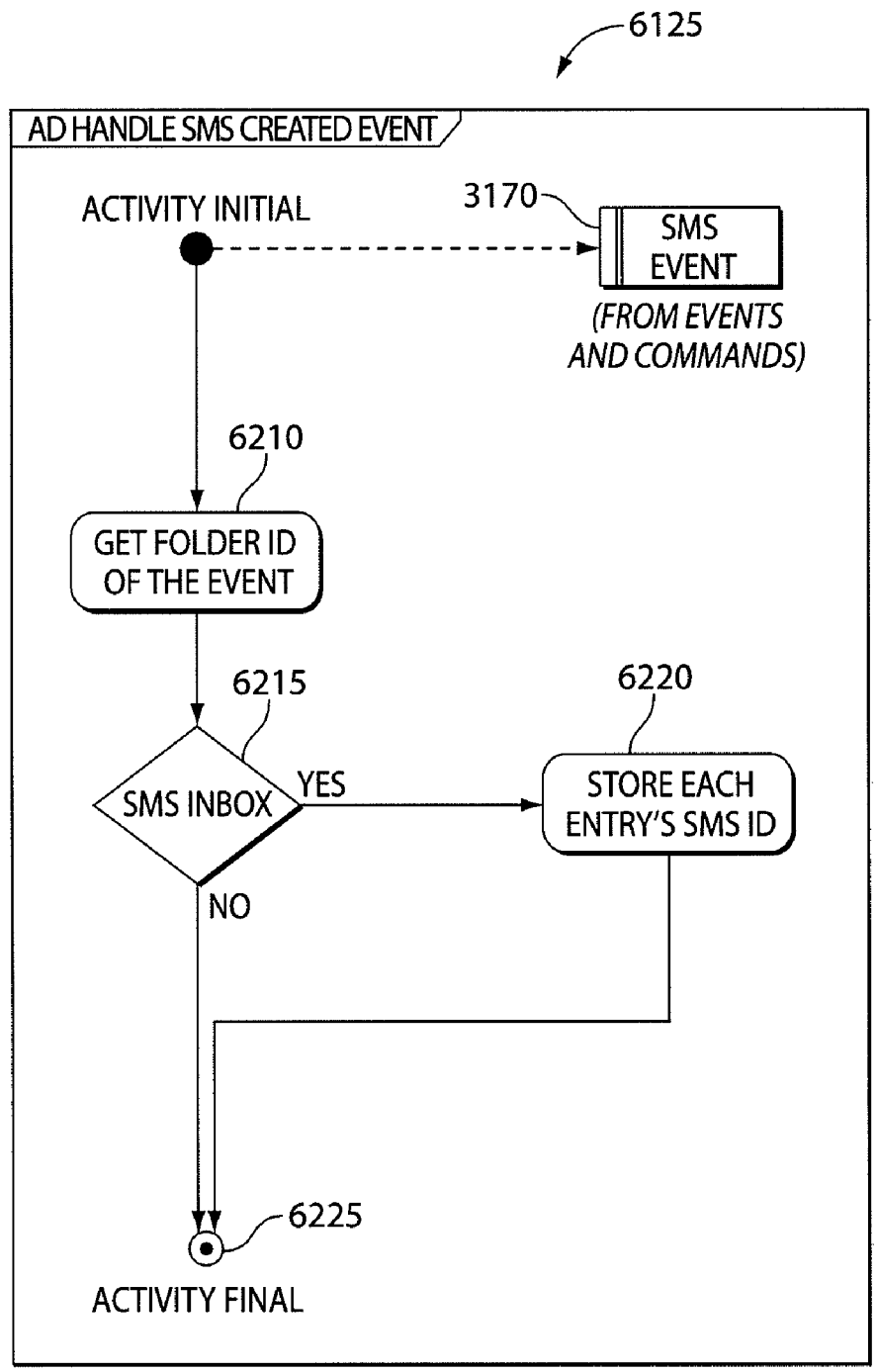

Referring to FIG. 6B, once the second user receives a SMS, the application module 2091 determines if the event type is an SMS Changed Event 6120 (see FIG. 6D and associated description) or an SMS Created Event 6125 (see FIG. 6C and associated description). If the event type is neither changed nor created, the application module 2091 returns to its original state and waits for a next User Event, SMS or Call Event.

Referring to FIG. 6C, when a SMS is created at stage 6210 the application module 2091 collects the Folder ID of the event. At stage 6215, the application module 2091 determines whether the created SMS is in the inbox. If the created SMS is in the inbox, at stage 6220, each entry's SMS ID is stored. If the created SMS is not in the inbox, the application module proceeds to completion, stage 6225.

Figure 6D:
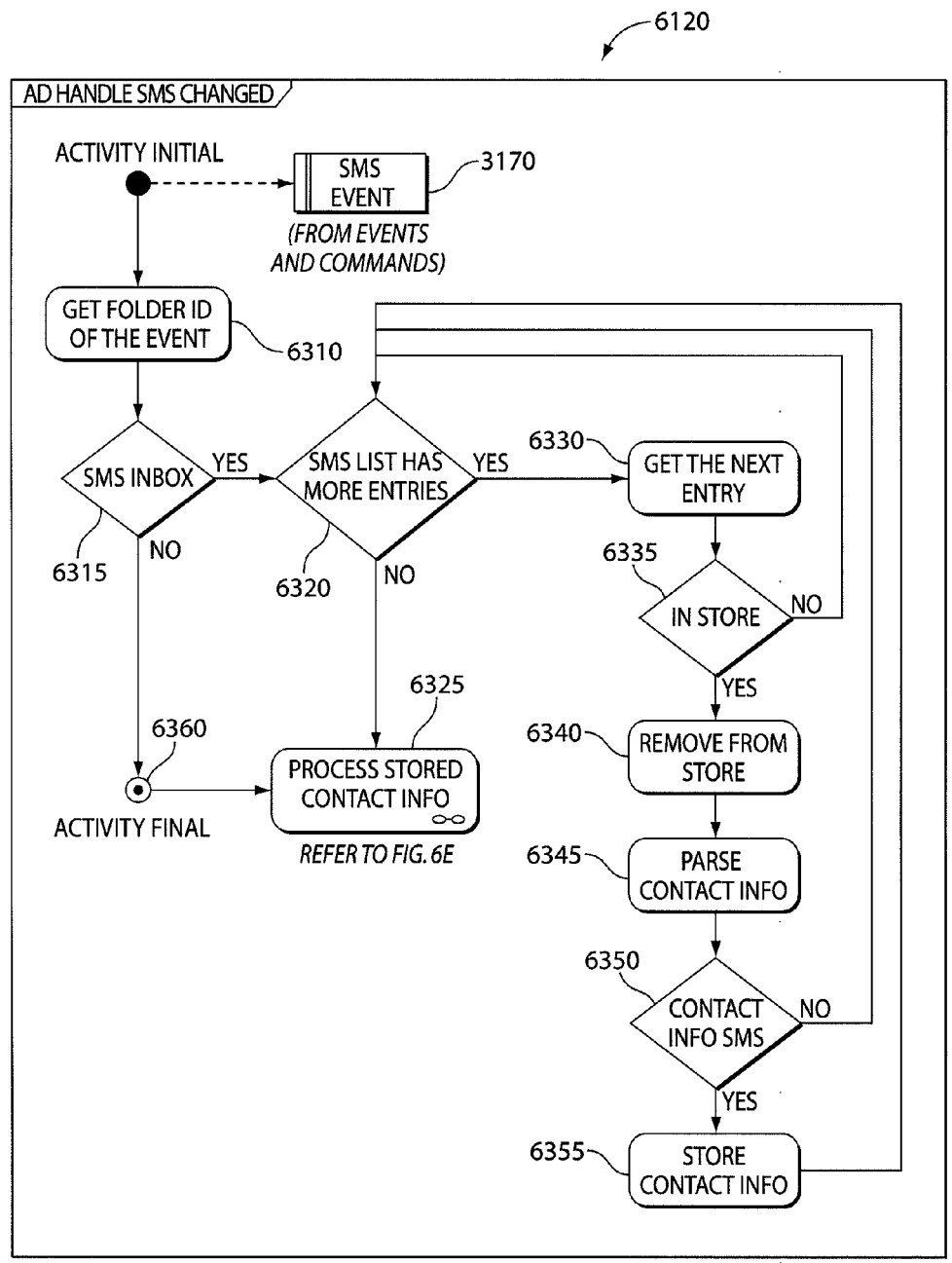

Referring to FIG. 6D, at stage 6310, the second user application module 2091 collects the Folder ID of the event. At stage 6315, the system checks whether the changed SMS is in the inbox. If the changed SMS is in the inbox, the application module 2091 checks whether there are more entries within the inbox. If not, the application module 2091 processes the stored contact information, at stage 6325 (see FIG. 6E and associated description). If there are more entries within the inbox, at stage 6330, the application module 2091 collects the next entry. At stage 6335, the application module 2091 stores the first SMS and then returns to the SMS inbox and checks for the next available SMS. Once the entry is InStore, at stage 6340, the application module 2091 removes the entry from the Store and parses the contact information, at stage 6345. At stage 6350, the application module 2091 determines whether the contact information is a CallerXchange SMS. If it is not, the application module 2091 returns to stage 6320. If the contact information is a CallerXchange SMS, the application module 2091 stores the contact information, at stage 6325 (see FIG. 6E and associated description). Once the final SMS is processed, the application module proceeds to stage 6360.

Figure 6E:
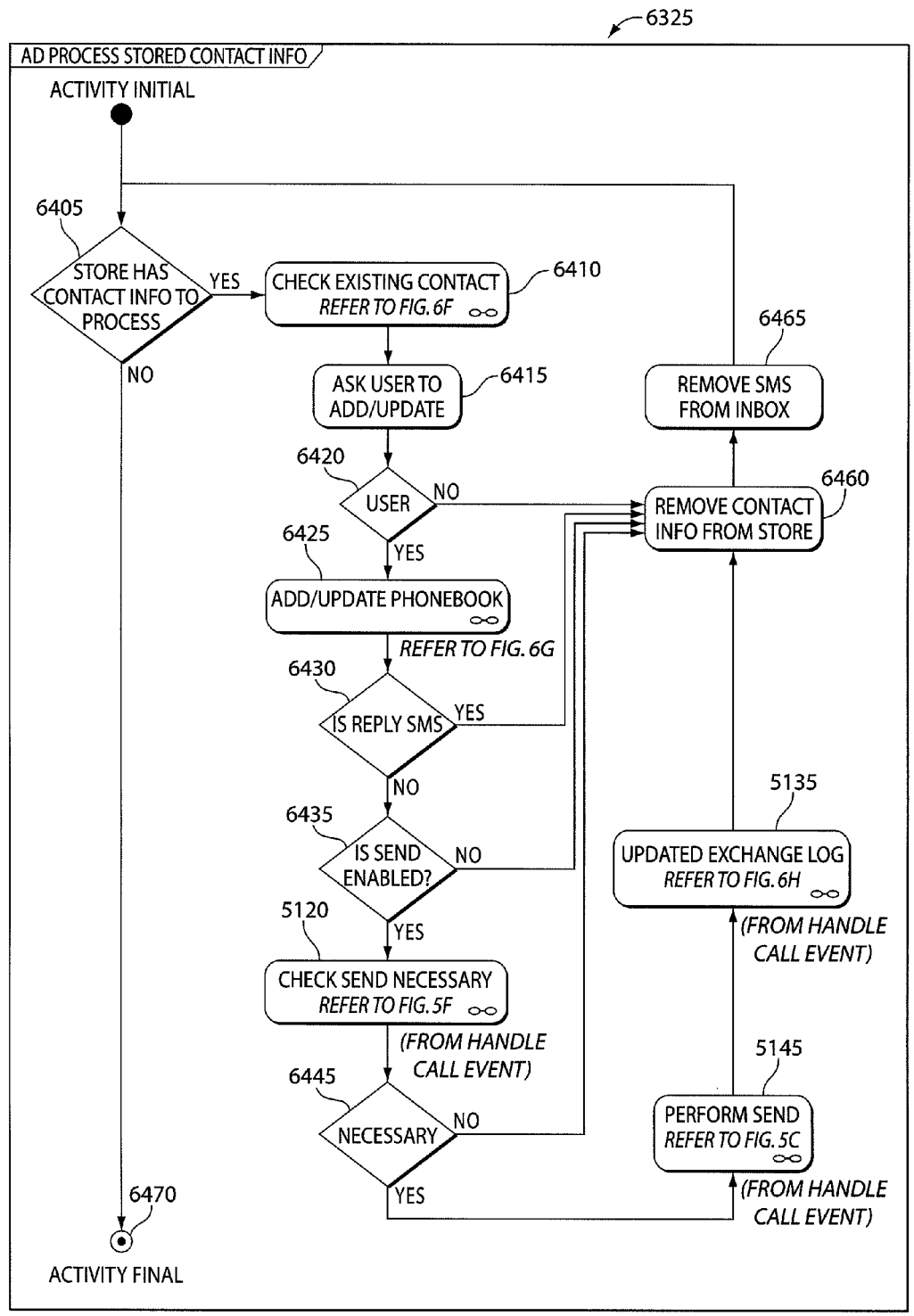

Referring to FIG. 6E, at stage 6405, the second user application module 2091 detects that the SMS Store has CallerXchange specific SMS messages. At stage 6410, the application module 2091 checks if this is an existing contact within the second user phonebook module 2055 (see FIG. 6F and associated description). At stage 6420, the second user application module 2091 displays a message. For example, one of two messages: "Add first user?" (second user phonebook module 2055) or "Update first user?," is displayed, depending on whether the first user is already stored in the second user phonebook 2055. At stage 6425, if the second user selects "Add" or "Update", then the first user contact entry is stored or updated in the second user phonebook module 2055 (see FIG. 6G and associated description). If the new record is created or updated successfully, the second user application module 2091 displays a message, such as "first user added to phonebook" or "first user contact data updated."

If the second user application module 2091 can not create the new entry within the second user phonebook module 2055, the phone displays a "phonebook full" message through the Show Dialog Proactive Command 3130. At stage 6420, if the second user selects "no," then the second user application module 2091 removes the contact information from the store, at stage 6460, and removes the CallerXchange SMS at stage 6465. The store is checked for additional CallerXchange SMS messages that are available. At stage 6430, the second user is prompted "Send MyProfile to first user?" (see FIG. 5C and associated description). The second user application module 2091 checks "Is send enabled?" and "Check Send Necessary" (see FIG. 5F and associated description). The second user contact information stored in the MyProfile Data File 2085 is packaged in a SMS message and sent to the first user, at stage 5145 (see FIG. 5C and associated description). At stage 5135, the Last Number Dialed Data File 2087, the Last Call Time Data File 2084 and the Last SMS Sent Time Data File 2088 are updated (see FIG. 6H and associated description). At stages 6430 and 6435, if the second user prefers not to send MyProfile or if Send is not enabled, the second user application module 2091 removes the contact information from the store at stage 6460 and removes the CallerXchange SMS at stage 6465. The store is checked for additional CallerXchange SMS messages available.

Figure 6F:
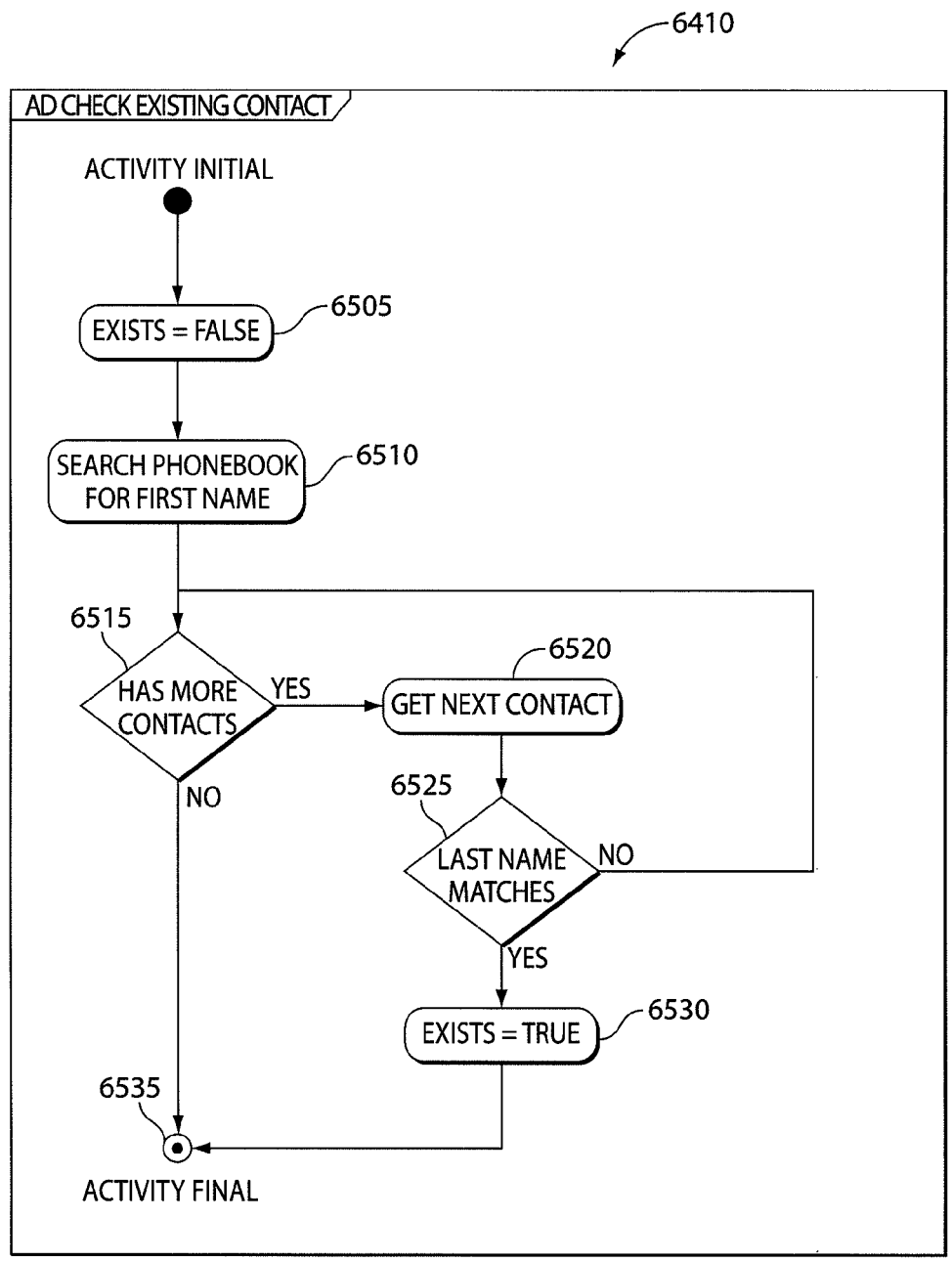

Referring to FIG. 6F, the SMS store processes contact information and the second user application module 2091 checks existing contact information in the second user phonebook module 2055. At stage 6505, the system determines whether a contact exists. If a contact does not exist, the second user application module 2091 searches the second user phonebook module 2055 for the first name of the contact, at stage 6510. If the second user phonebook module 2055 matches the first name of more than one contact in the phonebook, the last names (or surnames) are checked for a name matching that of the contact. At stage 6525, if the last name matches, the contact is saved in the phonebook and the second user application module 2091 asks the second user to Add/Update the contact within the phonebook (see FIG. 6E and associated description).

Figure 6G:
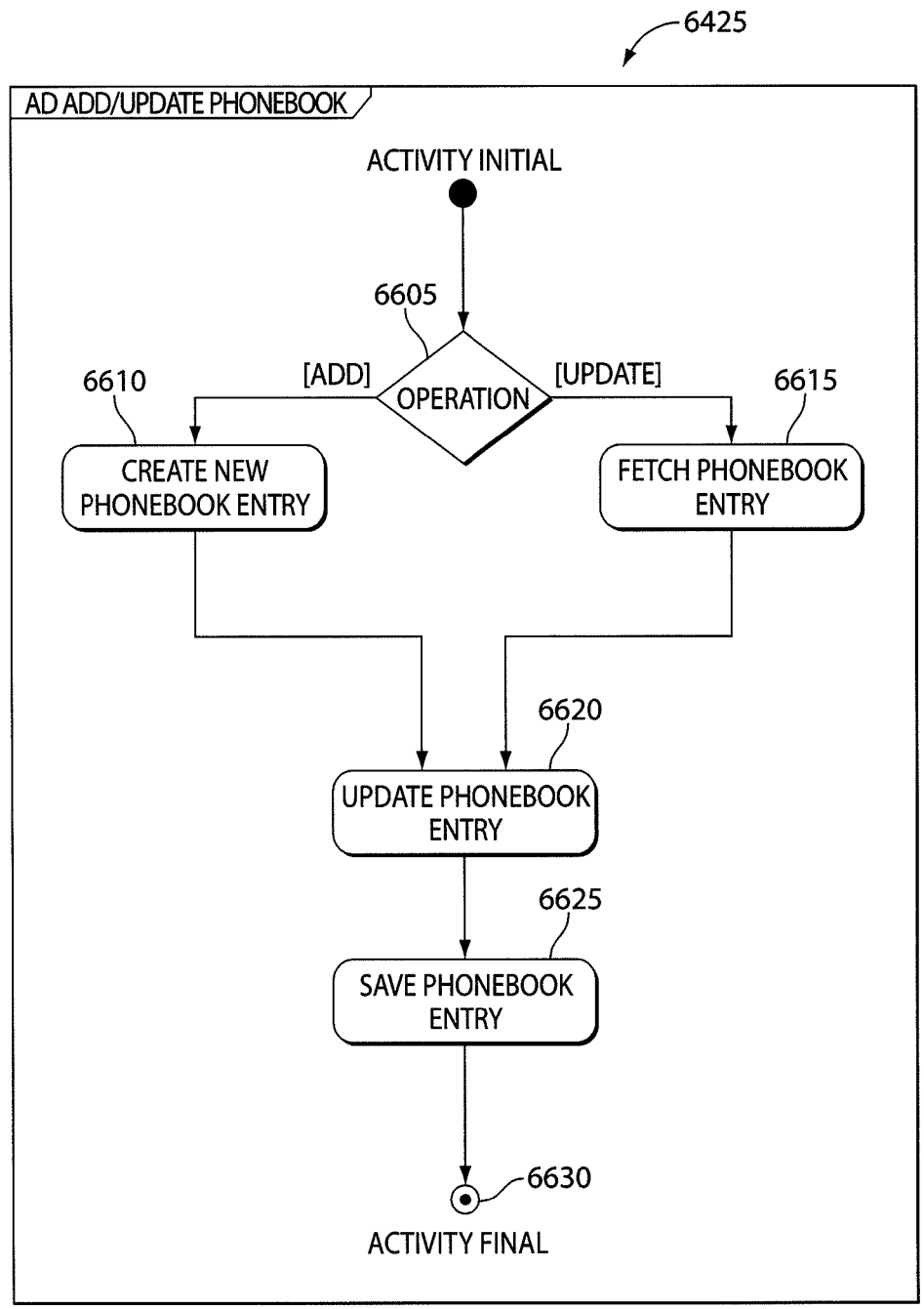

Contact information can be inserted or updated in the second user phonebook module 2055. Referring to FIG. 6G, the second user selects "Add" or "Update" at stage 6425 in FIG. 6E. The first user contact entry is stored or updated in the second user phonebook module 2055. If the first user does not exist as a contact in the second user phonebook module 2055 and the second user adds the first user to the phonebook, then a new phonebook entry is created, at stage 6610. If the first user already exists in the second user phonebook and the second user wants to update the first user's contact information, at stage 6615, the second user application module 2091 fetches a phonebook entry. If the new record is created or updated successfully, the second user application module 2091 displays a message, for example, "first user added to phonebook" or "first user contact data updated." At stage 6625, the added or updated contact information is saved and the second user application module 2091 returns to the Process Stored Contact Information (see FIG. 6E and associated description). If the second user application module 2091 can not create the new entry within the second user phonebook module 2055, the phone displays a "phonebook full" message through the Show Dialog Proactive Command 3130.

Figure 6H:
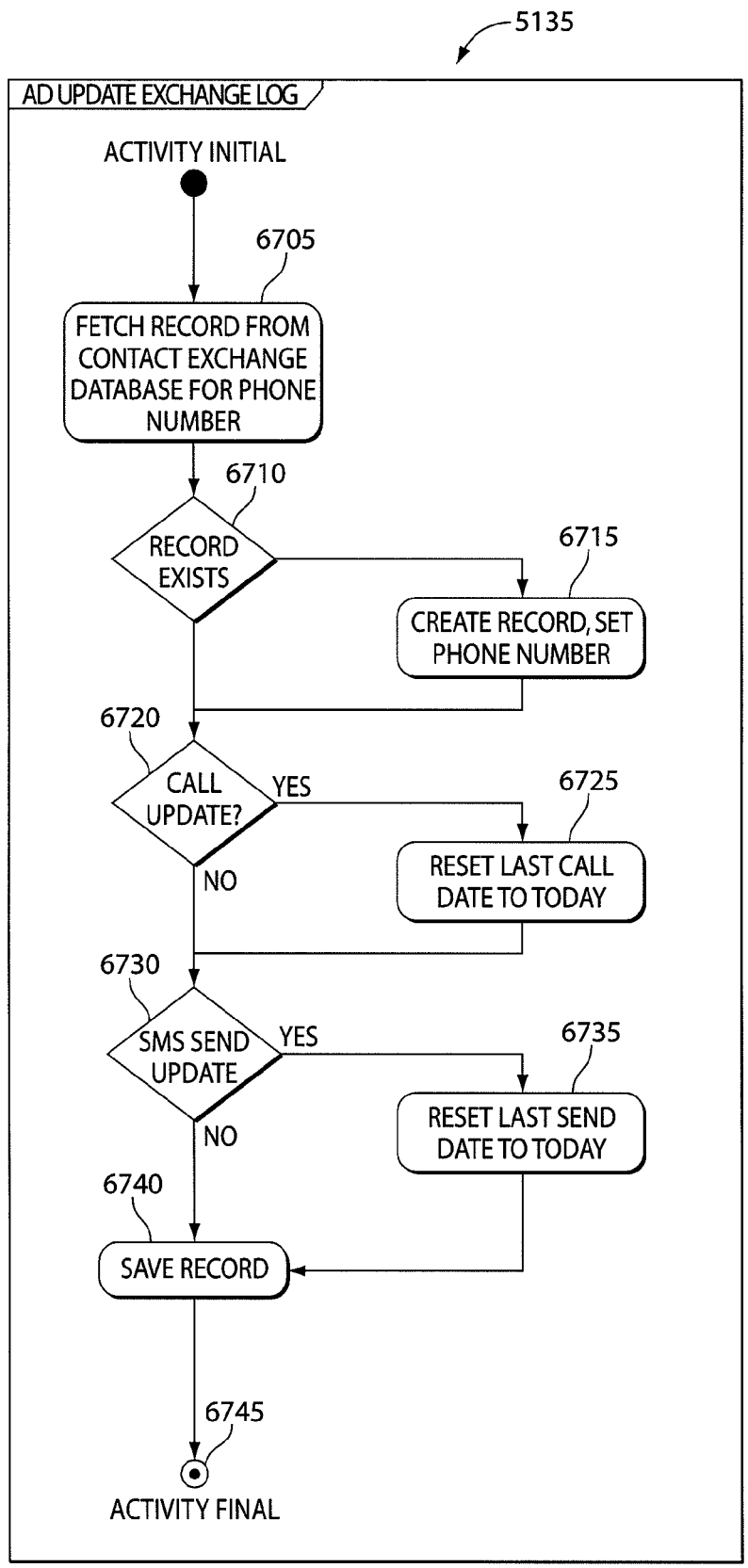

Referring to FIG. 6H, once the second user application module 2091 has gone through the Perform Send command (see stage 5145, in FIG. 6E and associated description), it reaches second user update exchange log file 2033, stage 5135. The second user application module 2091 checks the record against the contact exchange database for a first user phone number, stage 6705. If the record does not exist at stage 6710, then a record is created and the phone number is set at stage 6715. Once completed, or if the record already exists, at stage 6720 the application module determines whether a call was the method of communication. If "yes," the second user exchange log file 2033 resets the last call time data file 2084 to the current date, at stage 6725. If "no," the second user application module 2091 determines whether or not it was a SMS Send Update at stage 6730. If "yes," the second user exchange log file 2033 resets the last SMS sent time data file 2088 to "today" at stage 6735. At stage 6740, the record is saved and the second user application module 2091 returns to the Process Stored Contact Info process (see FIG. 6E and associated description).

In FIG. 7A, a method of manual application navigation is described. When the first user selects to operate the application module 2090 within the first user phone 2010, the menu selection event 3160 is triggered to activate the first user application module 2090.

Referring to FIG. 7B, a settings menu selection process 7010 is shown. At stage 7105, when the menu selection event 3160 is triggered, the first user application module 2090 shows the settings menu (see FIG. 7C and associated description). At stage 7115, the first user can either opt to "cancel" and exit the menu or choose a manual send option 7120 (see FIG. 7F and associated description).

Referring also to FIG. 7C, the settings menu allows the first user to change the first user application module 2090 defaults. The settings menu can be accessed by the first user during the following processes: Send MyProfile after a call or SMS, Update MyProfile after a call or SMS, Add Caller to phonebook, Update Caller in phonebook, Manual Send to a new user, or Manual navigation to the phone applications. At stage 7205, the first user has the following choices within the settings menu: a "Display Turn off Options Menu" at stage 7215, a "Display About Messages" at stage 7220, a "Display Edit MyProfile Menu" at stage 4125, a "Manual Send" at stage 7120 and a "Display Language Menu" at stage 7235.

At stage 7240, the first user makes a choice and the first user application module 2090 triggers the related action. The turn-off options menu 7215 provides the ability to disable or enable the sending and adding features. The disable send feature allows the first user to turn on/off the "Send MyProfile?" feature. If this featured is disabled, the first user is not be asked to send his or her contact information (stored in the first user MyProfile Data File 2035) after phone calls. The default value for the send feature is "enabled." The disable add feature allows the first user to turn on/off the "Add [CALLER] to phonebook?" message and feature. If this feature is disabled, the first user is not be asked to add a caller to the phonebook module 2015 if an application module 2090 SMS is received. The default value for the add feature is "enabled." The "About" function 7220 provides a brief description of the first user application module 2090 and the version information to the first user (see FIG. 7I and associated description). The "About" function 7220 also displays the operation mode, a metric used to determine in what mode the handset is allowing the first user application module 2090 to operate.

The Edit MyProfile Option 4125 displays the Edit MyProfile menu (see FIG. 4B and associated description). The "Language" function 7235 allows the first user to change the language of the first user application module 2090. The number and types of language options are determined by the Mobile Operator, for example. The default language can be set by the operator during implementation, coded into the first user application module 2090 or changed through an OTA campaign of the first user configuration data file 2039.

Figure 7D:
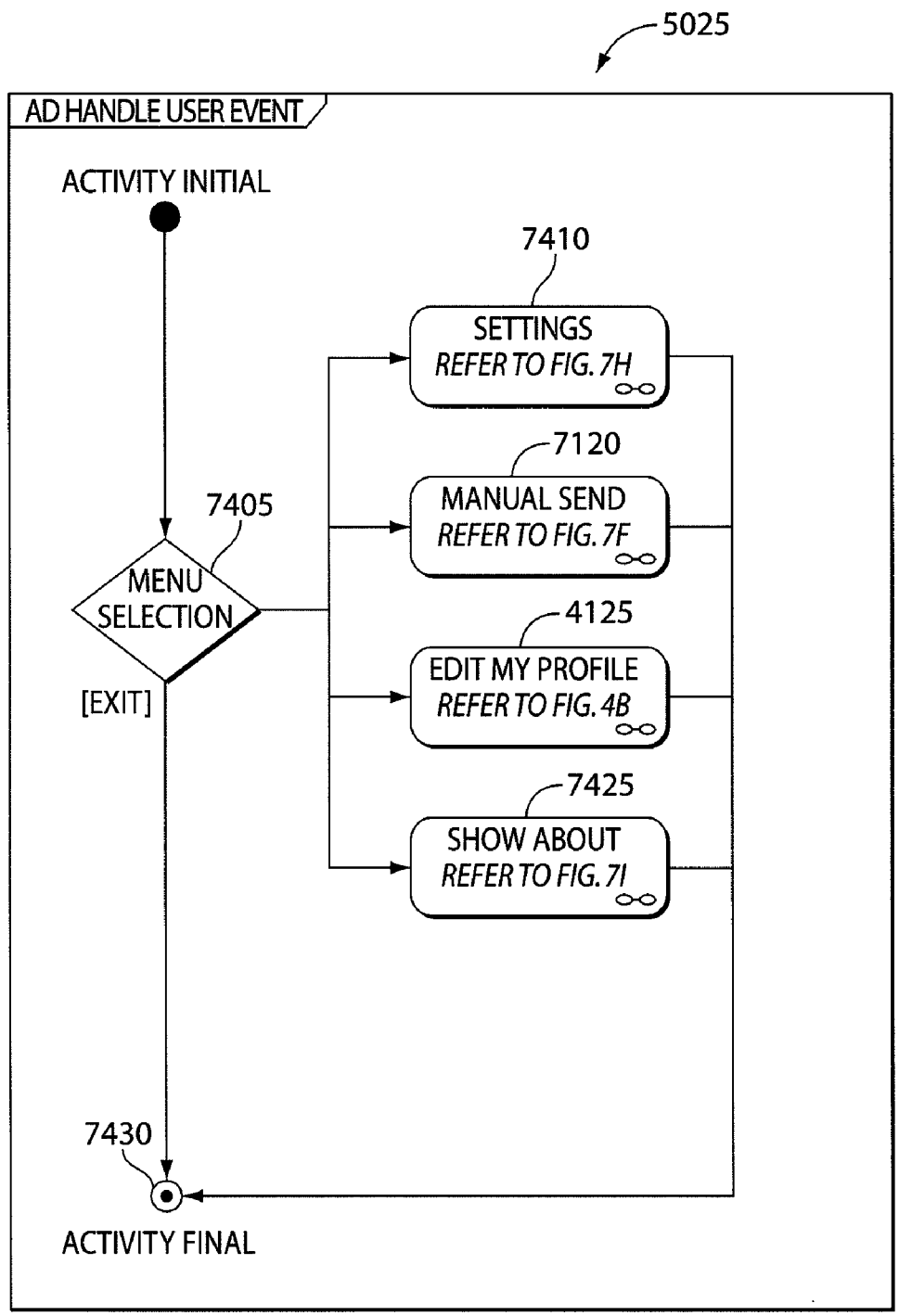

Referring to FIG. 7D, the first user application module 2090 displays a menu selection at stage 7405 with the following options: "Settings" (see FIG. 7C and associated description), "Manual Send" (see FIG. 7E and associated description), "Edit MyProfile" (see FIG. 4B and associated description) or "Show About" (see FIG. 7H and associated description). Once the User Event is complete, the application goes back to its original state and waits for the next User Event, SMS or Call Event.

Figure 7E:
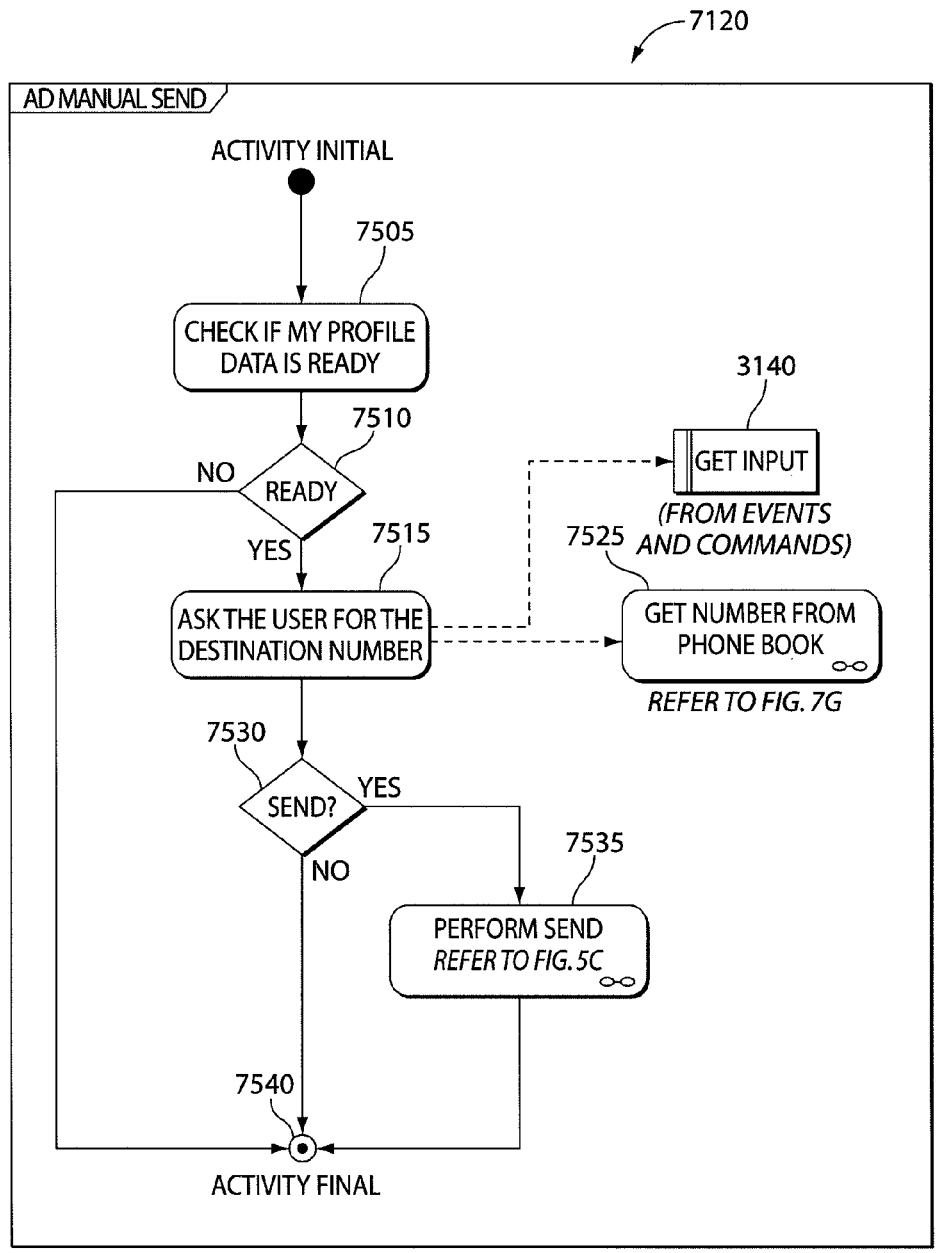

Referring to FIG. 7E, at stage 7505, the application module 2090 checks if MyProfile data is ready. If data is not ready, the first user application module 2090 does not send MyProfile data. If the MyProfile data is ready, the application asks the user for the destination number at stage 7515, where the first user can either manually enter the destination number (Get Input Proactive Command 3140) or pull the number from the phonebook (see FIG. 7F and associated description), stage 7525. The first user is asked if he or she would like to send MyProfile to the second user and if "yes" the first user application module 2090 will Perform Send (see FIG. 5C and associated description). If the first user does not decide to send, the application returns to its original state and waits for the next User Event, SMS or Call Event.

Figure 7F:
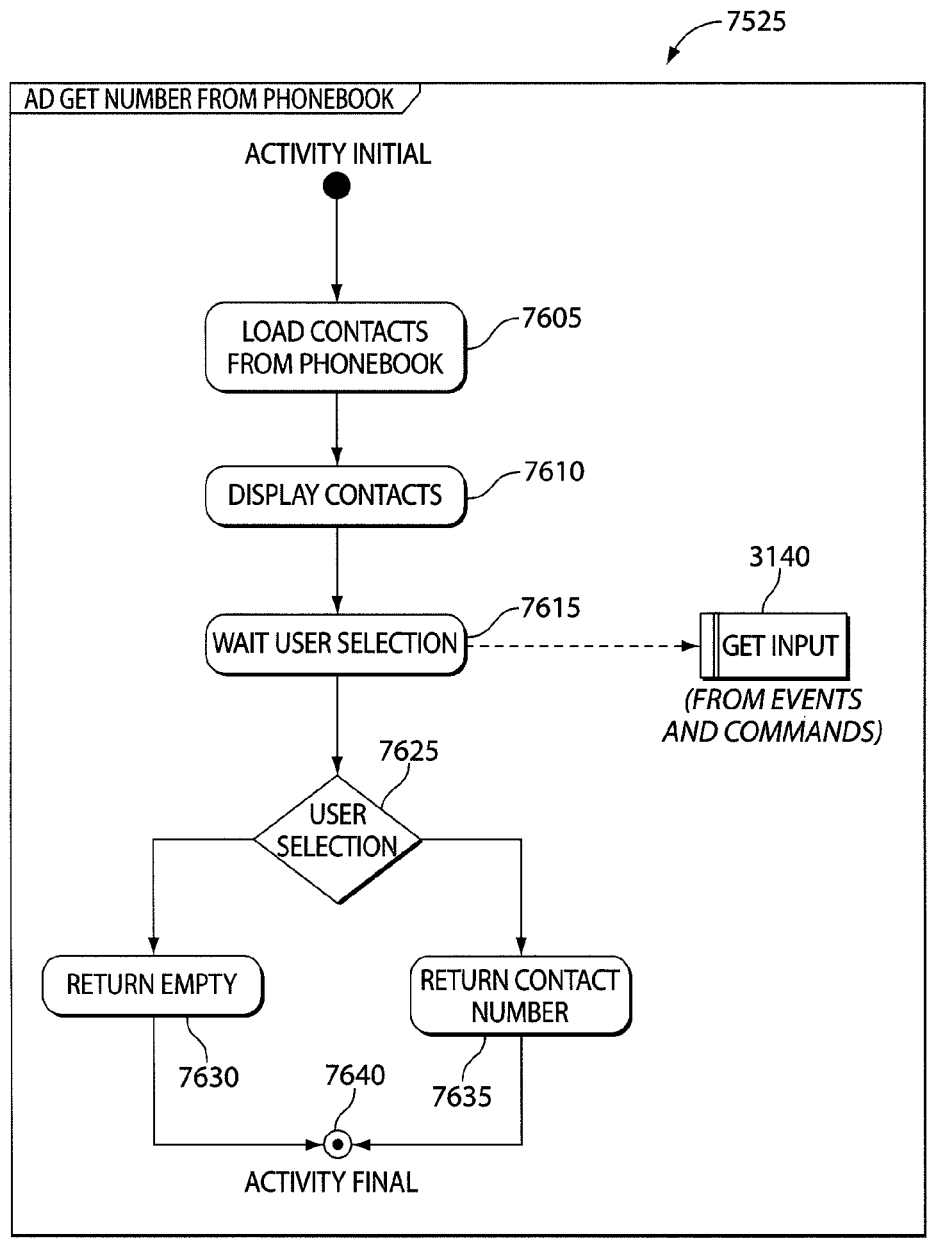

Referring to FIG. 7F, if the destination number of the contact already exists in the first user phonebook module 2015, the application loads contacts 7605 from the phonebook and displays contacts at stage 7610. At stage 7615, the application waits for the first user to select a contact and then retrieves the record. If the contact information is missing a destination number, the application returns empty, stage 7630. If the contact information is complete, the application returns the contact number at stage 7635. The application returns to the "Send?" stage 7530 and waits for the first user response.

Figure 7G:
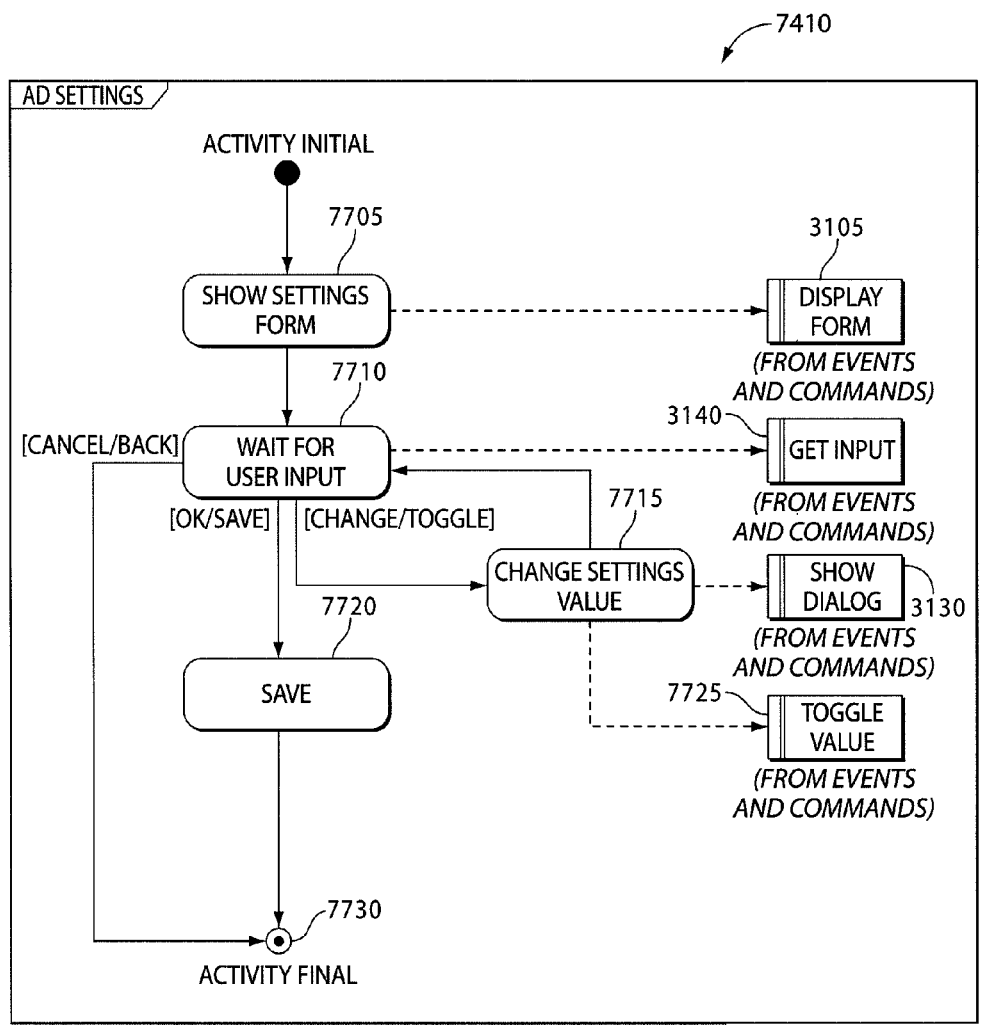

Referring to FIG. 7G, the first user chooses to view the settings menu (see FIG. 7C and associated description). The first user application module 2090 waits for the user input at stage 7710. The user can either select: "Cancel/Back" which ends the current action, "OK/Save" which, at stage 7720, saves any changes made to the settings or "Change/Toggle" which allows first user to make any changes to the settings. If any changes to the settings are made, the first user application module 2090 waits for more user input before saving changes.

Figure 7H:
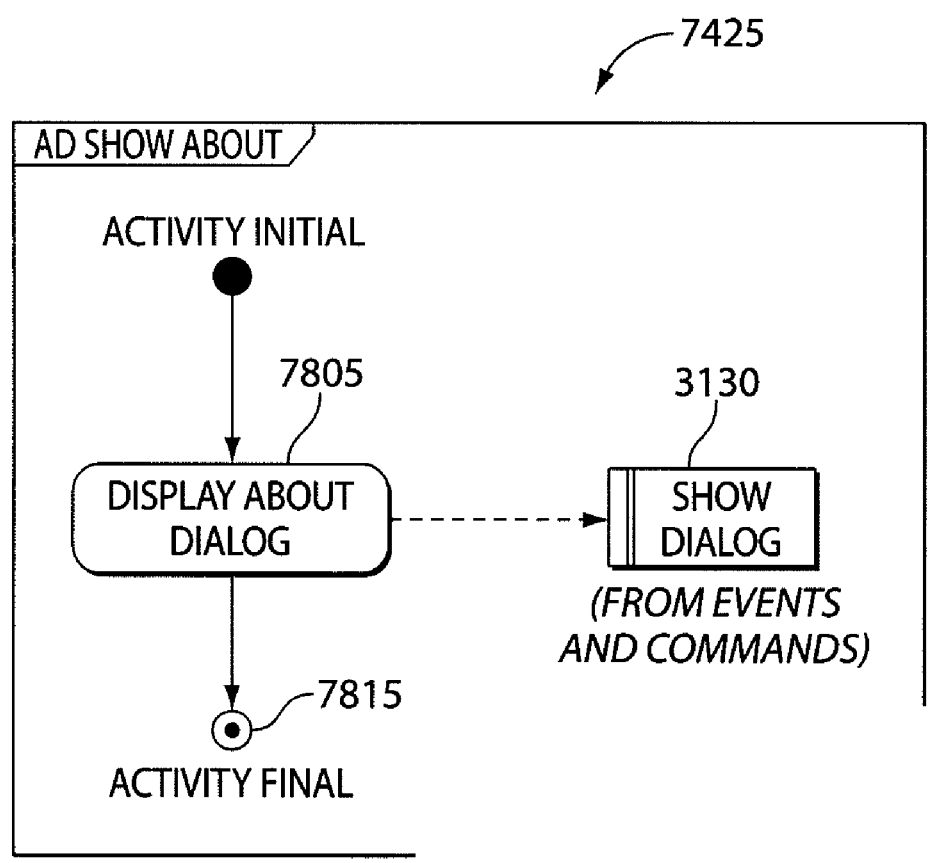

Referring to FIG. 7H, if the first user chooses "Show About" from the menu, the first user application module 2090 displays "About" dialog at stage 7805. The show dialog proactive command 3130 displays the following: "Setup your profile once, and exchange it with friends after phone calls and SMS messages. Contacts can be automatically inserted into your phonebook." If the user presses "Ok," the first user is routed to the second "About" screen where "CallerXchange\nv2.0.3RS\copyright OnePIN, Inc.\patents pending" is displayed.

Portions of the application of the invention can reside in the remote server 2003 and the exchanged information may also be stored in the remote database 2005 in addition to phonebook modules 2015 and 2055 for the first user and the second user, respectively, to access their information using the Internet. In this case, at the end of stage 4205 listed in the Edit MyProfile process (see FIG. 4B and associated description), the first user enters a password for web access to the first user's web account. The second user is also asked to enter a password for the second user's web account at the end of the Edit MyProfile process. The MyProfile information is automatically created for the first user and the second user at the remote database 2005. Within each account, a database of contacts is created for both the first user and the second user. The contact databases are populated, for example, using the process in FIG. 6E. A SMS message is created by the second user application module 2091 and sent to the remote server 2003. The remote server 2003 processes the SMS message and inserts to the second user's database of contacts within the remote database 2005. The remote server 2003 processes the SMS message and updates the first user's corresponding information to the second user's database of contacts within the remote database 2005. The first user and the second user can access their database of contacts within the remote database 2005 on their Personal Computer with an Internet connection using passwords and web services on remote server 2003.

The mobile operator can configure the application module 2090 using remote server 2003 with a methodology such as an OTA update. In order to configure the application module 2090, the mobile operator can use communication protocols such as a SMS, MMS, email, BIP or USSD. The mobile operator can configure the dialing rules file to comply with the geographic region. The operator can configure the mobile line detection to be either On or Off. The operator can also configure the SMS parameters (both text and binary) and configure the alternate SMSC (SMS Center) address to either On or Off. The operator can configure the application module 2090 to either allow or not allow (Yes/No) the sending of contact information to international numbers.

The methods and systems of embodiments of the present invention described above allow users to exchange business and personal contact information to other users over a mobile network. In other embodiments, businesses may use contact information systems of the present invention to provide data exchange between the customers, vendors, or others. In other embodiments, mobile operators may use the present invention to provide a mobile yellow pages or white pages directory between the customers, vendors, merchants or others.

Further, embodiments of the invention describe the exchange of contact information. Other information can be exchanged between the users, customers, vendors or others. For example, information such as photos, ring tones, other audio or visual information, music files and other information can be exchanged via the apparatus and systems described herein.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting.

The invention claimed is:

1. A mobile hardware device configured to receive information communicated over a network, the mobile hardware device comprising:
  a processor;
  a memory in communication with the processor and storing computer readable instructions configured to cause the processor to:
    detect an incoming multimedia messaging service ("MMS") message sent to the mobile hardware device over the network from a communication device;
    determine whether the incoming MMS message includes contact information relating to a user of the communication device;
    in response to determining that the incoming MMS message includes contact information, provide to a user of the mobile hardware device an option of storing at least a portion of the contact information included in the MMS message;
    determine whether a phonebook in communication with the processor already has existing contact information relating to the user of the communication device; and
    store at least a portion of the information contained in the incoming MMS communication received by the mobile device in the phonebook.

2. The mobile hardware device of claim 1 wherein the memory further includes instructions configured to cause the processor to prompt the user of the mobile hardware device to update the existing contact information in the phonebook using the contact information contained in the incoming MMS message.

3. The mobile hardware device of claim 2 wherein the instructions configured to cause the processor to store information is part of an operating system stored in the memory.

4. The mobile hardware device of claim 2 wherein the instructions are further configured to cause the processor to detect a call identifier of the communication to determine whether a calling number included in the contact information in the MMS is a mobile determine whether a phonebook in communication with the processor already has existing contact information relating to the user of the communication device; and store at least a portion of the information contained in the incoming MMS communication received by the mobile device in the phonebook.

5. The mobile hardware device of claim 1 further comprising a plurality of processors in communication with each other, wherein a first processor detects the incoming communication and a second processor stores information contained in the incoming communication.

\* \* \* \* \*

UNITED STATES PATENT AND TRADEMARK OFFICE
CERTIFICATE OF CORRECTION

PATENT NO. : 8,068,814 B2  Page 1 of 1
APPLICATION NO. : 13/084000
DATED : November 29, 2011
INVENTOR(S) : Feyzi Celik It is certified that error appears in the above-identified patent and that said Letters Patent is hereby corrected as shown below:

Column 1, lines 5 to 19, replace the text with:

This application is a continuation of U.S. Ser. No. 12/575,188, filed Oct. 7, 2009, which is a continuation of U.S. Ser. No. 11/540,820, filed September 28, 2006, now U.S. Pat. No. 7,836,011 which is a continuation-in-part of U.S. Ser. No. 11/353,452, filed February 13, 2006, now U.S. Pat. No. 7,813,725, which is a continuation-in-part of U.S.S.N. 11/056,022, filed on February 11, 2005, now U.S. Pat. No. 7,349,907, which is a continuation-in-part of patent application U.S.S.N. 10/879,331, filed June 29, 2004, now U.S. Pat No. 7,509,349, which is a continuation-in-part of patent application U.S.S.N. 10/657,757, filed September 8, 2003, now U.S. Pat. No. 7,296,036, which is a continuation of patent application U.S.S.N. 10/123,788, now U.S. Pat. No. 6,654,768, filed on April 16, 2002, which is a continuation of patent application U.S.S.N. 09/223,129, filed December 30, 1998, now U.S. Patent No. 6,374,259, which claims priority from U.S.S.N. 60/102,614, filed October 1, 1998 (Abandoned), each of which, with the exception of U.S.S.N. 10/123,788, now U.S. Pat. No. 6,654,768, is incorporated herein by reference.

Signed and Sealed this
First Day of May, 2012

David J. Kappos
*Director of the United States Patent and Trademark Office*

UNITED STATES PATENT AND TRADEMARK OFFICE
CERTIFICATE OF CORRECTION

PATENT NO. : 8,068,814 B2  
APPLICATION NO. : 13/084000  
DATED : November 29, 2011  
INVENTOR(S) : Feyzi Celik Page 1 of 1

It is certified that error appears in the above-identified patent and that said Letters Patent is hereby corrected as shown below:

This certificate supersedes the Certificate of Correction issued May 1, 2012. The Certificate is vacated since Petition to accept unintentionally delayed claim of priority under 37 C.F.R. 1.78(a)(3)" was dismissed by the Office of Petitions. The Certificate of Correction was published in error and should not have been issued for this patent.

Signed and Sealed this  
Thirtieth Day of October, 2012

David J. Kappos  
*Director of the United States Patent and Trademark Office*

UNITED STATES PATENT AND TRADEMARK OFFICE
CERTIFICATE OF CORRECTION

PATENT NO. : 8,068,814 B2
APPLICATION NO. : 13/084000
DATED : November 29, 2011
INVENTOR(S) : Feyzi Celik Page 1 of 1

It is certified that error appears in the above-identified patent and that said Letters Patent is hereby corrected as shown below:

On the face of the patent in the Related U.S. Application Data section, replace the text of the first paragraph with:

Continuation of application No. 12/575188, filed October 7, 2009, now U.S. Pat. No. 8005507, which is a continuation of application No. 11/540,820, filed September 28, 2006, now U.S. Pat. No. 7,836,011, which is a continuation-in-part of application No. 11/353,452, filed February 13, 2006, now U.S. Pat. No. 7,813,725, which is a continuation-in-part of application No. 11/056,022, filed February 11, 2005, now U.S. Pat. No. 7,349,907, which is a continuation-in-part of application No. 10/879,331, filed June 29, 2004, now U.S. Pat No. 7,509,349, which is a continuation-in-part of application No. 10/657,757, filed September 8, 2003, now U.S. Pat. No. 7,296,036, which is a continuation of application No. 10/123,788, filed on April 16, 2002, now U.S. Pat. No. 6,654,768, which is a continuation of application No. 09/223,129, filed December 30, 1998, now U.S. Patent No. 6,374,259, which claims priority to U.S. Provisional application No. 60/102,614, filed October 1, 1998.

Column 1, lines 4 to 19, replace the text with:

This application is a continuation of U.S. Ser. No. 12/575188, filed October 7, 2009, now U.S. Pat. No. 8005507, which is a continuation of divisional of U.S. Ser. No. 11/540,820, filed September 28, 2006, now U.S. Pat. No. 7,836,011 which is a continuation-in-part of U.S. Ser. No. 11/353,452, filed February 13, 2006, now U.S. Pat. No. 7,813,725, which is a continuation-in-part of U.S.S.N. 11/056,022, filed February 11, 2005, now U.S. Pat. No. 7,349,907, which is a continuation-in-part of U.S.S.N. 10/879,331, filed June 29, 2004, now U.S. Pat No. 7,509,349, which is a continuation-in-part of U.S.S.N. 10/657,757, filed September 8, 2003, now U.S. Pat. No. 7,296,036, which is a continuation of U.S.S.N. 10/123,788, filed on April 16, 2002, now U.S. Pat. No. 6,654,768, which is a continuation of U.S.S.N. 09/223,129, filed December 30, 1998, now U.S. Patent No. 6,374,259, which claims priority from U.S.S.N. 60/102,614, filed October 1, 1998, each of which, with the exception of U.S.S.N. 10/123,788, now U.S. Pat. No. 6,654,768, and is incorporated herein by reference in its entirety.

Signed and Sealed this
Fourth Day of December, 2012

David J. Kappos
*Director of the United States Patent and Trademark Office*